United States Patent
Lin

(10) Patent No.: US 10,885,362 B2
(45) Date of Patent: Jan. 5, 2021

(54) FACIAL RECOGNITION METHOD AND APPARATUS AND IMPOSTER RECOGNITION METHOD AND APPARATUS

(71) Applicant: Alibaba Group Holding Limited, Grand Cayman (KY)

(72) Inventor: Junsui Lin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 295 days.

(21) Appl. No.: 15/987,781

(22) Filed: May 23, 2018

(65) Prior Publication Data
US 2018/0357500 A1    Dec. 13, 2018

(30) Foreign Application Priority Data

Jun. 13, 2017   (CN) .......................... 2017 1 0444122

(51) Int. Cl.
| | |
|---|---|
| *G06K 9/00* | (2006.01) |
| *G06F 21/32* | (2013.01) |
| *G06T 7/70* | (2017.01) |
| *G06K 9/32* | (2006.01) |
| *G06K 9/38* | (2006.01) |

(52) U.S. Cl.
CPC ......... *G06K 9/00899* (2013.01); *G06F 21/32* (2013.01); *G06K 9/00288* (2013.01); *G06K 9/00912* (2013.01); *G06K 9/32* (2013.01); *G06K 9/38* (2013.01); *G06T 7/70* (2017.01); *G06F 2221/2111* (2013.01)

(58) Field of Classification Search
CPC ..... G06K 9/00288; G06F 3/011; G06F 21/32; G06F 3/013; G02B 27/017

USPC ................................. 382/118, 103, 190, 289
See application file for complete search history.

(56) References Cited

U.S. PATENT DOCUMENTS

| | | | |
|---|---|---|---|
| 6,219,639 | B1 | 4/2001 | Bakis et al. |
| 6,879,709 | B2 | 4/2005 | Tian et al. |
| 7,317,815 | B2 | 1/2008 | Steinberg et al. |
| 7,436,988 | B2 | 10/2008 | Zhang et al. |
| 7,519,828 | B2 | 4/2009 | Kittler et al. |
| 7,545,962 | B2 | 6/2009 | Peirce et al. |
| 7,725,732 | B1 | 5/2010 | Ballard |
| 8,180,112 | B2 | 5/2012 | Kurtz et al. |
| 8,213,737 | B2 | 7/2012 | Steinberg et al. |

(Continued)

FOREIGN PATENT DOCUMENTS

| | | |
|---|---|---|
| CN | 20101254201 A | 3/2012 |
| CN | 104794465 | 7/2015 |

*Primary Examiner* — Charlotte M Baker

(57) ABSTRACT

A face recognition method and apparatus, the method comprising: capturing a first image, the first image including a face content of a user and a background content; adjusting a relative position between an image capture device and the user; capturing a second image after the relative position is adjusted, the second image comprising a second face content of the user and a second background content; comparing the face content and the background content in the first image with those in the second image respectively and obtaining difference information; and determining that the user is an authentic user or an impostor according to the difference information. According to embodiments of the present application, the problem that current face liveness detection methods fail in recognizing impostors can be solved.

22 Claims, 13 Drawing Sheets

(56) References Cited

U.S. PATENT DOCUMENTS

| | | |
|---|---|---|
| 10,614,204 B2 * | 4/2020 | Tussy ................ G06K 9/00597 |
| 2004/0223629 A1 | 11/2004 | Chang |
| 2006/0126905 A1 | 6/2006 | Loo |
| 2006/0177110 A1 | 8/2006 | Imagawa et al. |
| 2006/0293891 A1 | 12/2006 | Pathuel |
| 2008/0260212 A1 | 10/2008 | Moskal et al. |
| 2009/0113209 A1 | 4/2009 | Lee et al. |
| 2009/0232361 A1 | 9/2009 | Miller |
| 2011/0007174 A1 | 1/2011 | Bacivarov et al. |
| 2011/0188712 A1 | 8/2011 | Yoo et al. |
| 2012/0134547 A1 | 5/2012 | Jung |
| 2013/0188840 A1 | 7/2013 | Ma et al. |
| 2014/0337973 A1 | 11/2014 | Foster et al. |
| 2017/0076165 A1 | 3/2017 | Weiss |

* cited by examiner

FACIAL RECOGNITION METHOD AND APPARATUS AND IMPOSTER RECOGNITION METHOD AND APPARATUS

PRIORITY CLAIM

This application claims priority to China Patent Application No. 201710444122.3 filed Jun. 13, 2017, which is incorporated herein by reference in its entirety.

TECHNICAL FIELD

The present application relates to the field of image recognition, and in particular, to a facial recognition method and apparatus based on image analysis, an impostor recognition method and apparatus, an authentication method, a recognition device, a computer device, and a computer-readable storage medium.

BACKGROUND

Currently, face liveness detection has been widely applied in the field of security verification. For example, before a user performs a certain transaction operation, face liveness detection is performed on the user first; and if it is detected that the user is a live user himself rather than a photograph of the authentic user or a video of the authentic user displayed by an impostor, the user passes the security verification; and the user is allowed to perform the transaction operation.

During face liveness detection, a face image of a current user may be captured by an image capture device, and image analysis is performed on the face image to detect whether the current user is the live user himself; or, the user is instructed to perform a certain action; then, multiple consecutive face images of the current user are captured by the image capture device; and it is judged whether the user currently performs the instructed action according to the multiple face images, so as to recognize whether the current user is the authentic and live user himself.

However, for the aforementioned face recognition methods based on image analysis, an impostor can use multiple unlawful means such as a consecutive image attack, a video playback attack, or an action simulation software attack, causing the aforementioned face recognition methods to erroneously recognize the impostor as an authentic user. Therefore, the face liveness detection methods in the prior art have the problem of being unable to recognize impostors.

SUMMARY

Embodiments of the present application provide a face recognition method based on image analysis, a face recognition apparatus based on image analysis, an impostor recognition method, an impostor recognition apparatus, an authentication method, and a recognition device.

In order to solve the aforementioned problem, the present application provides a face recognition method based on image analysis, comprising: capturing a first image, the first image comprising a face content of a user and a background content; adjusting a relative position between an image capture device and a user; capturing a second image after the relative position is adjusted, the second image comprising a second face content of the user and a second background content; comparing the face content and the background content in the first image with those in the second image respectively and obtaining difference information; and determining whether the user is an authentic user or an impostor according to the difference information.

Alternatively, the adjusting a relative position between an image capture device and a user comprises adjusting a position of the image capture device or prompting to adjust a position of the user.

Alternatively, the adjusting comprises adjustment in at least one direction in a horizontal line connecting the image capture device and the use; and comparing the face content and the background content in the first image with those in the second image respectively and obtaining difference information comprises: comparing changes in areas between the areas occupied by the face content and the background content in the first image with those occupied by the face content and the background content in the second image respectively and obtaining changes in areas.

Alternatively, determining that the user is an authentic user or an impostor according to the difference information comprising judging whether ratios of changes in areas between the areas occupied by the face content and the background content in the first image and those occupied by the face content and the background content in the second image are consistent; and if so, determining that the user is an impostor.

Alternatively, the adjusting comprises adjustment in at least one direction within a plane perpendicular to the image capture device and the user; and the comparing the face content and the background content in the first image with those in the second image respectively and obtaining difference information comprises: comparing changes in contents between the face content and the background content in the first image with those in the second image respectively and obtaining changes in contents.

Alternatively, the determining that the user is an authentic user or an impostor according to the difference information comprises: if both the face content and the background have no changes in contents, determining that the user is an impostor.

Alternatively, before capturing a second image after the relative position is adjusted, the method further comprises: adjusting a direction in which the image capture device is pointing to the user.

Alternatively, before comparing the face content and the background content in the first image with those in the second image respectively and obtaining difference information, the method further includes: selecting a background object having a clear boundary from the background content; and the comparing the face content and the background content in the first image with those in the second image respectively and obtaining difference information comprises: comparing the face content and the background object in the first image with those in the second image and obtain difference information.

Alternatively, when the adjusting a relative position between an image capture device and a user is prompting the user of the position, the method further comprises: prompting a time limited for the adjustment, and starting timing after the prompting; and the capturing a second image after the relative position is adjusted comprises: capturing the second image after the time limit for the adjustment is reached.

Alternatively, the method further includes: if it is determined that the user is an impostor, generating a risk prompt regarding the impostor.

The present application further provides a face recognition apparatus based on image analysis, comprising: a first image capture module, configured to capture a first image, the first image comprising a face content and a background content; a relative position adjustment module, configured to adjust a relative position between an image capture device and a user; a second image capture module, configured to capture a second image after the relative position is adjusted, the second image comprising a second face content of the user and a second background content; a difference information comparison module, configured to compare the face content and the background content in the first image with those in the second image respectively and obtain difference information; and a user determining module, configured to determine whether the user is an authentic user or an impostor according to the difference information.

The present application further provides an impostor recognition method, comprising: capturing a first image, the first image comprising a face content and a background content; adjusting a relative position between an image capture device and a user; capturing a second image after the relative position is adjusted, the second image comprising a second face content of the user and a second background content; comparing the face content and the background content in the first image with those in the second image respectively and obtaining difference information; and determining whether the user is an authentic user or an impostor according to the difference information; if it is determined that the user is an impostor, generating a risk prompt regarding the impostor.

The present application further provides an impostor recognition apparatus, comprising: a first image capture module, configured to capture a first image, the first image comprising a face content and a background content; a relative position adjustment module, configured to adjust a relative position between an image capture device and a user; a second image capture module, configured to capture a second image after the relative position is adjusted, the second image comprising a second face content of the user and a second background content; a difference information comparison module, configured to compare the face content and the background content in the first image with those in the second image respectively and obtain difference information; and a user determining module, configured to determine whether the user is an authentic user or an impostor according to the difference information; and a risk prompt module, configured to, if it is determined that the user is an impostor, generate a risk prompt regarding the impostor.

The present application further provides an authentication method, comprising: capturing a first image at a first relative position between a capture device and a to-be-captured object, wherein the first image comprises a biometrics content of the to-be-captured object and a background content; capturing a second image at a second relative position between a capture device and a to-be-captured object, wherein the second image comprises a biometrics content of the to-be-captured object and a background content; acquiring difference information of the biometrics content and/or the background content in the first image and the second image; and determining whether authentication succeeds.

Alternatively, the relative position includes a relative distance between the capture device and the to-be-captured object.

Alternatively, the relative position includes a relative angle between the capture device and the to-be-captured object.

Alternatively, the step of determining whether authentication succeeds comprises: determining whether the authentication succeeds according to the difference information.

Alternatively, the step of acquiring difference information of the biometrics content and/or the background content in the first image and the second image comprises: acquiring changes in areas between areas occupied by the biometrics content and/or the background content in the first image and those occupied by the biometrics content and/or the background content in the second image; and the step of determining whether the authentication succeeds according to the difference information comprises: judging whether ratios of changes in areas between the areas occupied by the biometrics content and the background content in the first image and those occupied by the biometrics content and the background content in the second image are consistent; and if so, determining that the authentication fails; and if not, determining that the authentication succeeds.

Alternatively, the step of acquiring difference information of the biometrics content and/or the background content in the first image and the second image comprises: acquiring changes in contents between the biometrics content and/or the background content in the first image and those in the second image; and the step of determining whether the authentication succeeds according to the difference information comprises: if the biometrics content and/or the background have no changes in contents, determining that the authentication fails; if the biometrics content and/or the background have changes in contents, determining that the authentication succeeds.

The present application further provides a recognition device, comprising an image capture device, first prompt information, and second prompt information; the image capture device is configured to capture a first image, the first image comprising a face content and a background content; the first prompt information is configured to show a prompt for adjusting a relative position between the image capture device and a user; the image capture device is further configured to capture a second image after the relative position is adjusted; the recognition device is configured to compare the face content and the background content in the first image with those in the second image respectively and obtain difference information, and determine that the user is an authentic user or an impostor according to the difference information; and the second prompt information is configured to, if it is determined that the user is an impostor, generate a risk prompt regarding the impostor.

Compared with the prior art, the embodiments of the present application have the following advantages: a first image and a second image are respectively captured before and after a relative position between an image capture device and a user is adjusted; difference information between a face content and a background content in the first image and those in the second image is compared; and an authentic user or an impostor is determined according to the difference information, so that an impostor can be detected even if the impostor performs face liveness recognition by means of a consecutive image attack, a video playback attack, an action simulation software attack, or the like, thereby solving the problem that current face liveness detection methods cannot recognize impostors.

Further, a background object having a clear boundary is selected from the background content; difference information between the face content and the background object in the first image and those in the second image is compared; and the user is determined to be an authentic user or an impostor according to the difference information, so as to avoid obtaining wrong difference information due to an object content having a fuzzy boundary, thereby improving the accuracy of identifying an authentic user or an impostor.

Further, after an impostor is identified, a risk prompt is correspondingly generated to prompt an authentic user to take corresponding precautionary measures, so as to avoid personal information leakage or property loss caused by the consecutive image attack, the video playback attack, or the action simulation software attack of the impostor.

Further, a first image and a second image of an to-be-captured object are respectively captured at a first relative position and a second relative position; information about differences between biometrics content of the to-be-captured object and a background content in the first image and those in the second image is obtained; and whether liveness authentication succeeds is determined according to the difference information, so that a non-living user can be recognized even if liveness authentication is performed by means of a consecutive image attack, a video playback attack, an action simulation software attack, or the like, thereby solving the problem that current liveness authentication methods cannot recognize non-living users.

DETAILED DESCRIPTION OF THE EMBODIMENTS

Figure 1:
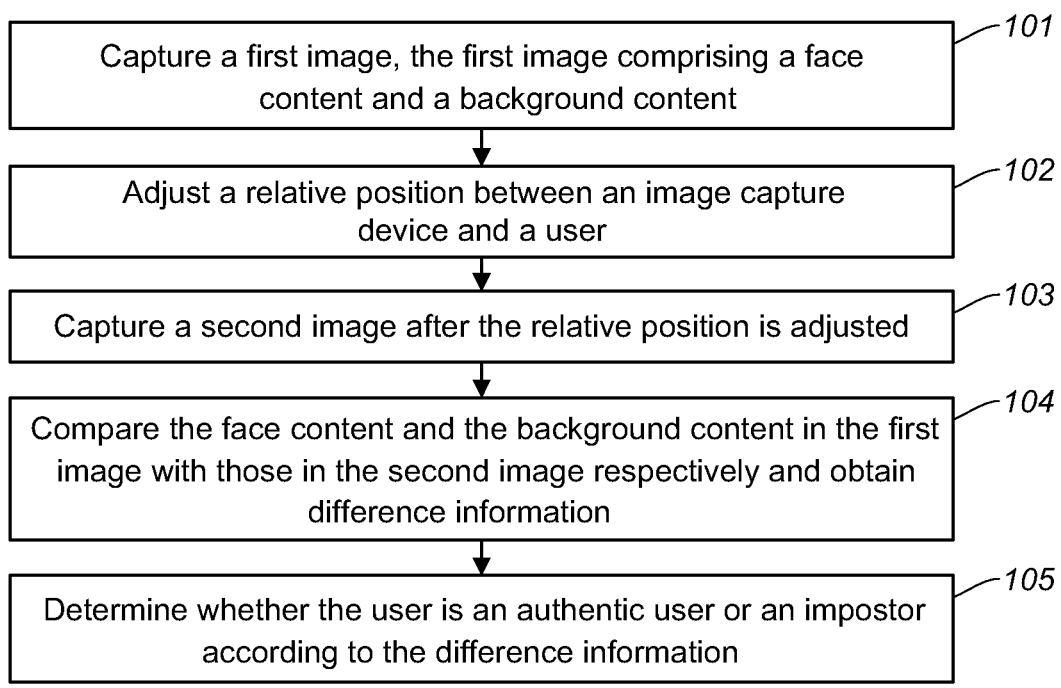
FIG. 1 is a flowchart illustrating steps of a face recognition method based on image analysis according to Embodiment 1 of the present application.

To make the above-mentioned objectives, features, and advantages of the present application more easy to understand, the present application is further described below in detail in combination with the accompanying figures and the specific implementation embodiments.

First, it should be noted that the present application may be implemented as an application software applied or used in security monitoring scenarios in which a user performs electronic transactions, account login password modification, personal private information viewing, important data modification, and the like. The application software includes the function of recognizing a current user as an authentic user or an impostor based on image analysis. The present application may also be implemented as a plug-in of a software to monitor data security of the software or serve as a basis for recognizing software operations. The method provided in the present application may also be implemented using hardware, such as an ASIC (Application Specific Integrated Circuit) or a FPGA (Field-Programmable Gate Array).

In an actual scenario where security verification is done through a face liveness recognition method, a user may need to perform the following operations like electronic transactions, account login password modification, and personal private information viewing, which are related to information security and property security of the user through a mobile terminal such as a mobile phone, a tablet computer, or a desktop computer. Security verification of the user identity is usually required before the operations are performed; that is, the user is allowed to perform the operations only after the current user is recognized as an authentic user and security verification succeeds; the operations are prohibited if security verification fails.

Security verification of the user identity may be performed through face liveness recognition. Specifically, the mobile terminal may prompt the current user to face a camera of the mobile terminal for real-time photographing, and the camera may capture an image having a face content of the current user.

The mobile terminal may perform image analysis on the captured image, including recognizing a face from the image, extracting a piece of representative biometrics content such as eyes, nose, eyebrows, and the mouth for the face; the mobile terminal then compares the one or more pieces of biometrics content with a preset biometrics content of the authentic user to recognize whether the face in the image is a face of the authentic user, and judges whether security verification succeeds according to a recognition result.

In order to prevent an impostor from attacking the aforementioned static face liveness recognition method using a photograph, the mobile terminal may further prompt the current user to perform one or more specified actions such as nodding, head shaking, blinking, and mouth opening when the photograph is taken in real time; consecutive images are taken when the current user performs the actions; it is then judged whether the actions performed by the current user are specified actions according to continuous changes of feature points of the consecutive images by using certain rules or methods such as machine learning; and the mobile terminal decides whether the current user is a living body of the authentic user according to a recognition result of the face feature points in the images.

However, an impostor may launch a spoofing attach to the aforementioned face recognition method through various unlawful means. For example, consecutive images attack: an impostor uses a series of photographs of an authentic user performing a certain action to simulate the specified action through a slide show; for another example, video playback attack: an impostor prerecords a video of an authentic user performing a certain action, and plays the video clip during the facial recognition; for another example, action simulation software attack: after acquiring a face image of an authentic user, an impostor extracts face feature points through action simulation software, synthesizes an animation of the real user performing a certain action, and plays the animation during face liveness recognition.

With the aforementioned spoofing attacks, an impostor may be erroneously recognized as an authentic user himself during a face liveness recognition process and succeeds in security verification; and the impostor is allowed to perform operations such as electronic transactions, account login password modification, and personal private information viewing, leading to the risks of personal information leakage or property loss of the real user himself.

Therefore, in view of the problem that the current face recognition methods cannot recognize impostors, an embodiment of the present application provides a face recognition method based on image analysis to differentiate an authentic user from an impostor.

In order to facilitate in-depth understanding of the embodiments of the present application for those skilled in the art, definitions of various terms will be introduced first below.

Face content: an image content having face image features in an image. The face image features may be a full face, or may be a partial face, or may be one or more facial features on the face. For example, the face content may be a full face or may be an upper part of the face in the image; or it may be a combination of one or more of facial features such as eyes, nose, eyebrows, and mouth on the face.

Background content: an image content excluding the currently photographed target object (for example, the face content) in the image. The background content may include one or more background objects, including scenes, animals, people, objects, and the like. For example, tall building, passengers, and vehicles behind the target object when the target object is photographed.

Image capture device: a device for capturing images. For example, a camera, a camera on a mobile terminal, or a webcam.

First image: an image captured before a relative position between a user and the image capture device is adjusted, including the face content and the background content.

Second image: an image captured after the relative position between the user and the image capture device is adjusted, including the face content and the background content.

Difference information: changes in areas and/or content between the content or the areas occupied by the face content and the background content in the first image and the content of those occupied by the face content and the background content in the second image. For example, an area (an area proportion in the image) occupied by the face content in the first image is 42%, and an area occupied by the face content in the second image is 63%; this means that the area occupied by the face content in the first image and that occupied by the face content in the second image are different; and a change ratio of the two areas is 63%/42%=1.5, which may be used as difference information for the face content in the first image and the second image. For another example, an area occupied by a certain background content in the first image is 10%, and an area occupied by the certain background content in the second image is still 10%; this means that a change ratio of the two areas is 10%/10%=1, which may be used as difference information of the background content in the first image and the second image. For another example, the background content in the first image includes a background object A and a background object B, the background content in the second image includes the background object A and a background object C; this means that the background content in the first image and that in the second image are different; and the changed content may be used as difference information for the background content in the first image and the second image.

Biometrics content: a content including appearance features of a specific living thing. For example, features such as eyes, nose, eyebrows, and mouth of a face; for another example, limbs and body of a human body.

Embodiment 1

Embodiment 1 provides a face recognition method based on image analysis. The method may be specifically applied to a mobile terminal. FIG. 1 is a flowchart illustrating steps of a face recognition method based on image analysis according to Embodiment 1 of the present application. The method may specifically include the following step(s):

Step 101: Capturing a first image, the first image comprising a face content and a background content.

It should be noted that this embodiment of the present application may be applied to a mobile terminal such as a mobile phone, a tablet computer, or a desktop computer. The mobile terminal may include an image capture device such as a camera; in actual application, a camera or a webcam may also be used as the image capture device. The mobile terminal may be installed with a recognition application that performs authentic user recognition or impostor recognition on an image captured by the image capture device.

In specific implementation, when a user initiates a face recognition request through the recognition application, the recognition application may invoke the image capture device on the mobile terminal or start an external image capture device to photograph the face of the current user and the current photographing background; an image containing the face content and the background content is captured to serve as the aforementioned first image.

Step 102: Adjusting a relative position between the image capture device and the user.

After the first image is captured, the recognition application may instruct the user to adjust a position of the user relative to the image capture device. In order to adjust the relative position between the image capture device and the user, the object to be adjusted may be the image capture device; for example, the user is instructed to move a camera of a mobile phone; or the object to be adjusted may also be the user himself; for example, the user is prompted to move relative to the camera.

There may be many modes of adjusting the relative position. For example, adjustment may be made in a certain direction in a horizontal line connecting the image capture device and the user; for another example, adjustment may be made in a certain direction within a plane perpendicular to the image capture device and the user.

In actual application, the relative position may include a relative distance between the image capture device and the user; or it may include a relative angle between the image capture device and the user.

Step 103: Capturing a second image after the relative position is adjusted.

After the relative position between the image capture device and the user is adjusted, the image capture device may again photograph the face of the current user and the current photographing background to capture an image containing the face content and the background content to serve as the aforementioned second image.

Step 104: Comparing the face content and the background content in the first image with those in the second image respectively and obtain difference information;

In specific implementation, the recognition application may compare the face content and the background content in the first image with the face content and the background content in the second image to determine information about the differences between the contents.

The difference information may include ratios of changes in areas between the areas occupied by the face content and the background content in the first image and those occupied by the face content and the background content in the second image. For example, areas occupied by the face content and the background content in the first image are respectively 24% and 10%; after the relative position is adjusted in a certain direction in the horizontal line connecting the image capture device and the user, areas occupied by the face content and the background content in the second image are respectively 36% and 15%; This means the ratios of changes in areas between the areas occupied by the face content and the background content in the first image and those occupied by the face content and the background content in the second image are both 1.5; and the change ratio may be used as the difference information for the face content and the background content in the first image and the second image.

The difference information may also include changes in contents between the face content and the background content in the first image and those in the second image respectively. For example, the face content is a full face and the background content contains two trees in the first image; and after the relative position is adjusted in a certain direction within the plane perpendicular to the image capture device and the user, the face content is still the full face, but the background content only contains one tree in the second image; this means that the background content changes in the second image; and the changed content may be used as difference information for the background content in the first image and the second image.

Step 105: Determining whether the user is an authentic user or an impostor according to the difference information.

The recognition application may judge that the current user is an authentic user or an impostor according to the difference information obtained through the aforementioned comparisons. In actual application, different difference information may be used as the judgment basis when different relative position adjusting methods are chosen.

For adjusting the relative position in a certain direction in the horizontal line connecting the image capture device and the user, and for the situation where the current user himself moves to be closer to or to be away from the image capture device, changes of areas in the face content and the background content in the first image and the second image may be used as difference information, which is then used as the judgment basis for judging whether the user is an authentic user.

After an authentic user adjusts a relative position with respect to the image capture device in a certain direction in a horizontal line connecting the image capture device and the user, the distance between the live real user and the image capture device changes; the distance between the background content and the image capture device, however, does not change. This means that areas occupied by the face content and the background content in the second image also change. Therefore, when ratios of changes in areas between the areas occupied by the face content and the background content in the first image and those occupied by the face content and the background content in the second image are inconsistent, it can be determined that the current user is an authentic user.

Figure 12:
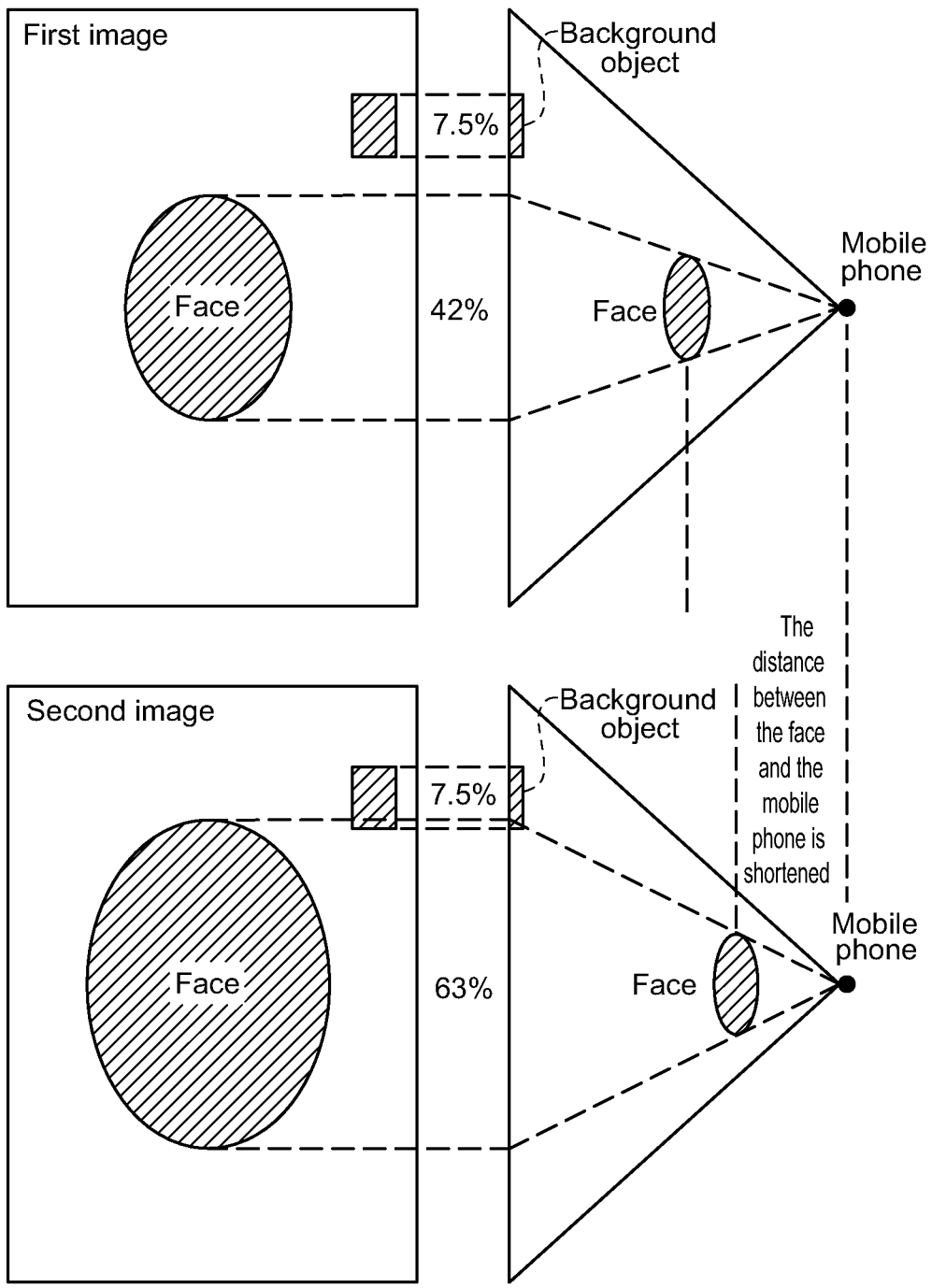
FIG. 12 is a schematic diagram illustrating a scenario of real user recognition in the present application.

FIG. 12 is a schematic diagram illustrating a scenario of real user recognition in the present application. The upper part in the figure is a scenario in which the image capture device captures a first image, and the lower part in the figure is a scenario in which the image capture device captures a second image after a distance adjustment.

In the scenario of capturing the first image, it can be seen from the content shown on the right side that a certain distance exists between the current user and a camera of a mobile phone; and a certain background object in the background is used as a background content. It can be seen from the content shown on the left side that in the first image captured by the camera of the mobile phone, the area occupied by a face content in the first image is 42%, and the area occupied by a background content in the first image is 7.5%.

In the scenario of capturing the second image, it can be seen from the content shown on the right side that if the current user is an authentic user and when the current user moves closer to the camera of the mobile phone, the distance between the face of the user and the camera of the mobile phone is shortened. However, the distance between the background content and the camera of the mobile phone remains unchanged. It can be seen from the content shown on the left side that in the second image captured by the camera of the mobile phone, the area occupied by the face content in the second image is increased to 63%, suggesting that the ratio of changes in areas between the face content area in the first image and that in the second image is 1.5.

However, because the distance between the background content and the camera of the mobile phone remains the same, i.e., the area occupied by the background content in the second image is still 7.5%. This means that the ratio of changes in areas between the background content area in the first image and that in the second image is 1. Because the ratios of changes in areas between the areas occupied by the face content and the background content in the first image and those occupied by the face content and the background content in the second image are inconsistent, it can be determined that the current user is an authentic user.

However, when an impostor performs live face recognition by means of a consecutive image attack, a video playback attack, an action simulation software attack, or the like, a different scenario is seen. Because a face content and a background content are both displayed on a certain display device, even if a relative position between the display device and the image capture device is adjusted in a certain direction in a horizontal line, the face and the background displayed on the display device simultaneously move closer to or away from the image capture device. In a second image captured by the image capture device for the face and the background on the display device, areas of the face content and the background content remain unchanged, suggesting that that ratios of changes in areas between the face content area and the background content area in the first image and those in the second image remain the same. Therefore, when the ratios of changes in areas are consistent, it can be determined that the current user in this scenario is an impostor.

Figure 13:
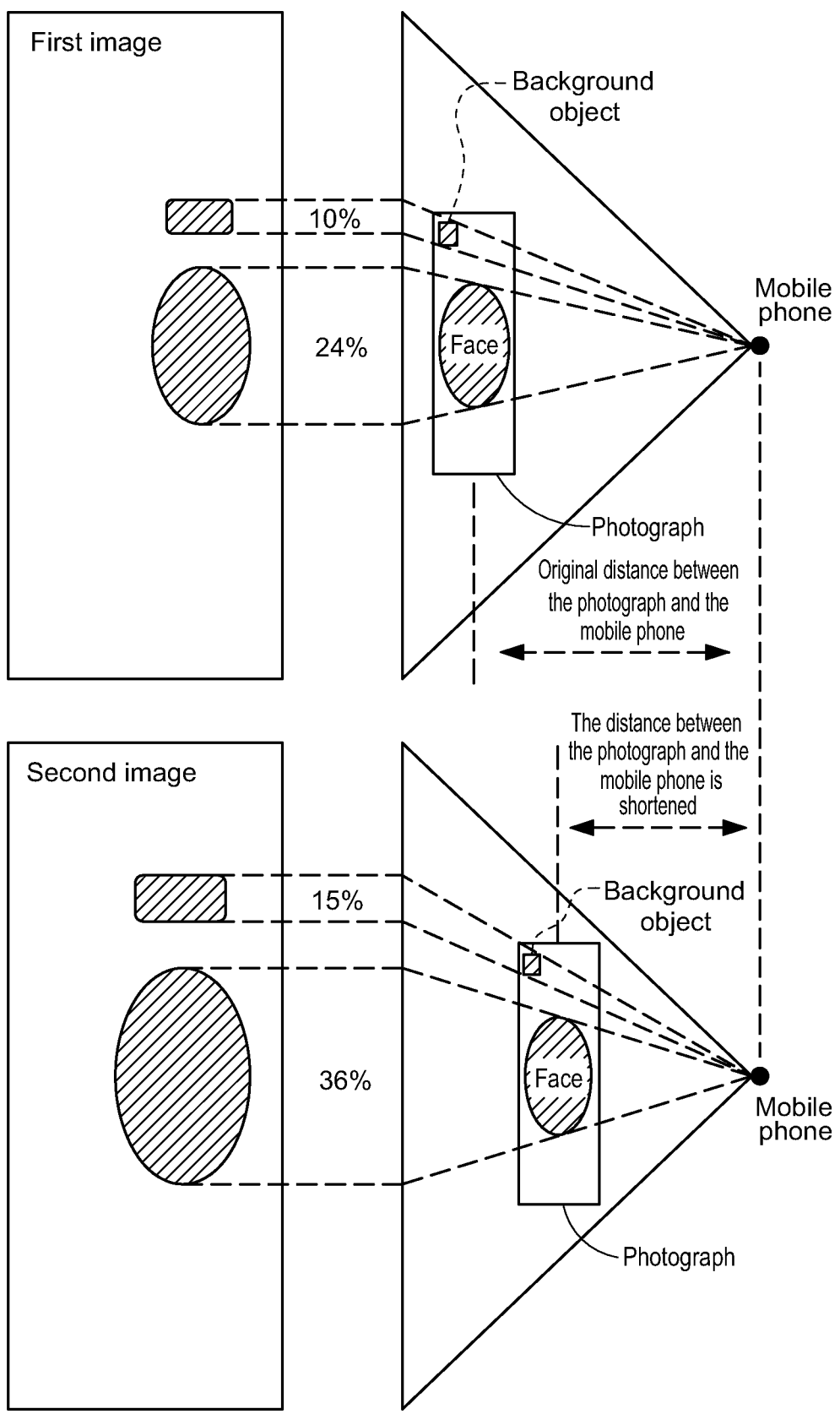
FIG. 13 is a schematic diagram illustrating a scenario of impostor recognition in the present application.

FIG. 13 is a schematic diagram illustrating a scenario of impostor recognition in the present application. The upper part in the figure is a scenario in which the image capture device captures a first image, and the lower part in the figure is a scenario in which the image capture device captures a second image after a distance adjustment.

In the scenario of capturing the first image, it can be seen from the content shown on the right side that a current impostor performs recognition with a photograph in hand; a certain distance exists between the photograph and a camera of a mobile phone; and a certain background object in the background of the photograph is used as a background content. It can be seen from the content shown on the left side that in the first image captured by the camera of the mobile phone, the area occupied by a face content in the first image is 24%, and the area occupied by a background content in the first image is 10%.

In the scenario of capturing the second image, it can be seen from the content shown on the right side that if the current user is an impostor and after being prompted to adjust a relative position, the impostor moves the photograph to a position closer to the camera of the mobile phone; the distances between the face content in the photograph and the camera of the mobile phone and between the background content in the photograph and the camera of the mobile phone are both shortened. It can be seen from the content shown on the left side that in the second image captured by the camera of the mobile phone, the area occupied by the face content in the second image is increased to 36%, suggesting that the ratio of changes in areas between the face content area in the first image and that in the second image is 1.5.

Since the distance between the background object in the photograph and the camera of the mobile phone is also shortened, the area occupied by the background object in the second image is increased to 15%. This means that that the ratio of changes in areas between the background content area in the first image and that in the second image is 1.5. Because the ratios of changes in areas between the areas occupied by the face content and the background content in the first image and those occupied by the face content and the background content in the second image are both 1.5, it can be determined that the current user is an impostor.

It should be noted that in an application scenario in which an impostor uses a photograph or video clip for attack, the photograph or video clip blocks the real background content when the first image is captured; after the impostor receives a prompt and moves a terminal showing the photograph or playing the video clip away from the image capture device beyond a certain range, the photograph or video clip may not be able to block the real background content, suggesting that the second image captured by the image capture device contains not only the background content in the photograph or video clip but also part of the actual background content. The actual background content in the second image may affect recognition accuracy. For example, if the background content of the photograph and the real background content are similar or both are at the same position in the images, areas of the background content of the photograph in the first image and the real background content in the second image may be compared during recognition to obtain wrong difference information.

Therefore, a background content as a comparison object may be determined when the first image is captured; and after the second image is captured, changes of areas of the same background content in the two images are compared, so as to avoid obtaining of difference information of different background content, thereby improving recognition accuracy.

For adjusting the relative position in a certain direction within the plane perpendicular to the image capture device and the user, content changes between the face content and the background content in the first image and those in the second image may be used as difference information, which is then used as the judgment basis for judging whether the user is an authentic user.

After an authentic user adjusts a relative position in a certain direction within a plane perpendicular to the image capture device and the user, the live real user may block some content in the background content. This means that the background content in the second image might change greatly whereas the face content has no content change. Therefore, it can be determined that the current user is an authentic user when the face content has no content change but the background content has a content change.

However, when an impostor performs live face recognition by means of a consecutive image attack, a video playback attack, an action simulation software attack, or the like, a different scenario is seen. Because a face content and a background content are both displayed on a certain display device, even if a relative position between the display device and an image capture device is adjusted, the background content on the display device will not be blocked by the face content, suggesting that the face content and the background content both have no content change. Therefore, it can be determined that the current user is an impostor when both the face content and the background content have no changes in contents.

In actual application, for adjusting the relative position in a certain direction in the horizontal line connecting the image capture device and the user, content changes between the face content and the background content in the first image and those in the second image may be used as difference information, which is then used as the judgment basis for judging whether the user is an authentic user. For example, when the second image is captured after the current user moves closer to the image capture device, part of the background content may also be blocked if the user is an authentic user. This means that the background content in the second image might change greatly whereas the face content has no content change.

According to the embodiments of the present application, a first image and a second image are respectively captured before and after a relative position between an image capture device and a user is adjusted; difference information between a face content and a background content in the first image and those in the second image is compared; and an authentic user or an impostor is determined according to the difference information, so that an impostor can be detected even if the impostor performs face liveness recognition by means of a consecutive image attack, a video playback attack, an action simulation software attack, or the like, thereby solving the problem that current face liveness detection methods cannot recognize impostors.

Embodiment 2

Figure 2:
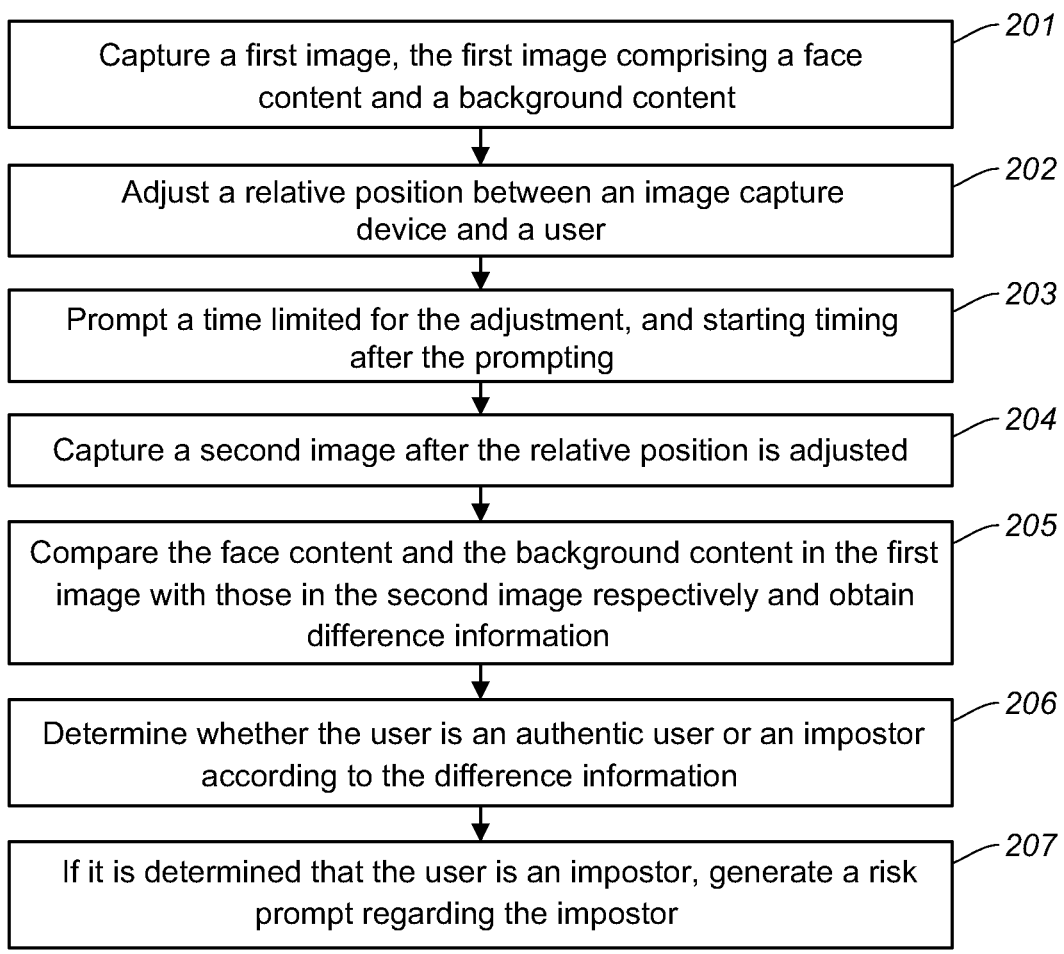
FIG. 2 is a flowchart illustrating steps of a face recognition method based on image analysis according to Embodiment 2 of the present application.

Embodiment 2 provides a face recognition method based on image analysis. The method may be specifically applied to a mobile terminal. FIG. 2 is a flowchart illustrating steps of a face recognition method based on image analysis according to Embodiment 2 of the present application. The method may specifically include the following steps:

Step 201: Capture a first image, the first image comprising a face content and a background content.

Step 202: Adjust a relative position between the image capture device and the user.

Alternatively, the step 202 includes: substep S11: when the adjusting a relative position between an image capture device and a user is prompting the user of a position, adjust a position of the image capture device or prompt the user to adjust the position of the user.

In specific implementation, a recognition application installed on the mobile terminal may prompt the current user to adjust a position of the image capture device relative to the user himself, or prompt the current user to adjust his own position relative to the image capture device; the user is then instructed to complete adjusting the relative position between the image capture device and the user.

After obtaining the prompt for position adjustment, the user may make corresponding adjustment according to the prompt. For example, the user may move the image capture device from the current position to another position away from or closer to the user himself; or, the user may fix the image capture device at the original position, and the user himself moves from the current position to another position closer to or away from the image capture device; or, the user vertically lowers or raises the image capture device or transversely moves the image capture device to the left or to the right; or, the user vertically lowers or rises himself or transversely moves to the left or to the right.

Step 203: Prompt a time limited for the adjustment, and start timing after the prompting.

When prompting the user to adjust the relative position is prompted, a time limited for the adjustment may also be prompted, and the current user may complete the adjustment within the time. Timing may start after the prompting, so as to trigger the image capture device to perform image capture after the time limit for the adjustment is reached.

Step 204: Capture a second image after the relative position is adjusted.

Alternatively, step 204 includes: substep S21: capture the second image after the time limit for the adjustment is reached.

After the time limit for the adjustment is reached, the image capture device may be triggered to perform image capture to obtain the second image.

Step 205: Compare the face content and the background content in the first image with those in the second image respectively and obtain difference information.

Alternatively, before step 205, the method further includes: selecting a background object having a clear boundary from the background content;

step 205 includes: substep S31: compare the face content and the background object in the first image with those in the second image and obtain difference information.

In specific implementation, an object content having a clear boundary may be searched for from the background content and selected as a background object. During comparison of the difference information of the face content and the background content in the first image and the second image, difference information comparison may be performed for a specific background object in the background content, so as to obtain more accurate difference information and improve the accuracy of a recognition result, thereby avoiding obtaining wrong difference information due to an object content having a fuzzy boundary that affects the accuracy of the recognition result. For example, ratios of changes in areas occupied by the face content and a certain article in the background content in the first image and those occupied by the face content and that certain article in the background content in the second image are compared; compared with determining the area of the entire background content in the image, a more accurate area is obtained by determining the area of a background object having a clear boundary in an image.

Step 206: Determine whether the user is an authentic user or an impostor according to the difference information.

Alternatively, the adjusting comprises adjustment in at least one direction in a horizontal line connecting the image capture device and the use, and the step 205 includes:

comparing changes in areas between the areas occupied by the face content and the background content in the first image with those occupied by the face content and the background content in the second image respectively and obtaining changes in areas. Alternatively, step 206 includes: substep S41: judge whether ratios of changes in areas between the areas occupied by the face content and the background content in the first image and those occupied by the face content and the background content in the second image are consistent; and sub step S42: if so, determine that the user is an impostor.

In specific implementation, when the adjusting by the current user is in at least one direction in a horizontal line connecting the image capture device and the user, the user himself moves closer to or away from the image capture device in the horizontal line. When determining whether the user is an authentic user or an impostor according to the difference information, it may be judged whether ratios of changes in in areas between the areas occupied by the face content and the background content in the first image and those occupied by the face content and the background content in the second image are consistent. If the ratios of changes in areas are inconsistent, it indicates that the current user is an authentic user; and therefore it can be determined that the current user is an authentic user; if the ratios of changes in areas are consistent, it indicates that the current user may perform recognition by means of a consecutive image attack, a video playback attack, an action simulation software attack, or the like; and therefore it can be determined that the current user is an impostor.

Alternatively, the adjusting comprises adjustment in at least one direction within a plane perpendicular to the image capture device and the user, and the step 205 includes: comparing changes in contents between the face content and the background content in the first image with those in the second image respectively and obtaining changes in contents.

Alternatively, step 206 includes: substep S51: if both the face content and the background have no changes in contents, determining that the user is an impostor.

In specific implementation, when the adjusting by the current user is in at least one direction within a plane perpendicular to the image capture device and the user and when determining whether the user is an authentic user or an impostor according to the difference information, it may be judged whether content changes between the face content and the background content in the first image and those in the second image are consistent.

If the face content has no content change and the background content shows changes, it indicates that the current user is an authentic user; and therefore it can be determined that the current user is an authentic user. If both the face content and the background content have no content changes, it indicates that the current user may perform recognition by means of a consecutive image attack, a video playback attack, an action simulation software attack, or the like; and therefore it can be determined that the current user is an impostor.

Alternatively, before step 202, the method further includes: adjusting a direction in which the image capture device is pointing to the user.

In actual application, after the adjustment is made in at least one direction within the plane perpendicular to the image capture device and the user, the face content of the current user may be outside the photographing range of the image capture device; and therefore the image capture device may be adjusted to make the photographing direction thereof point to the current position of the user.

Step 207: If it is determined that the user is an impostor, generating a risk prompt regarding the impostor.

In specific implementation, when it is recognized that the current user is an impostor, the recognition application may generate a risk prompt regarding the impostor and display the prompt on the mobile terminal. In actual application, the risk prompt may also be sent to an authentic user to prompt the real user to take corresponding precautionary measures.

According to this embodiment of the present application, a background object having a clear boundary is selected from the background content; difference information between the face content and the background object in the first image and those in the second image is compared; and the user is determined to be an authentic user or an impostor according to the difference information, so as to avoid obtaining wrong difference information due to an object content having a fuzzy boundary, thereby improving the accuracy of identifying an authentic user or an impostor.

In order to facilitate understanding of this embodiment of the present application by those skilled in the art, description will be made below with reference to the specific example of FIG. 11.

Figure 11:
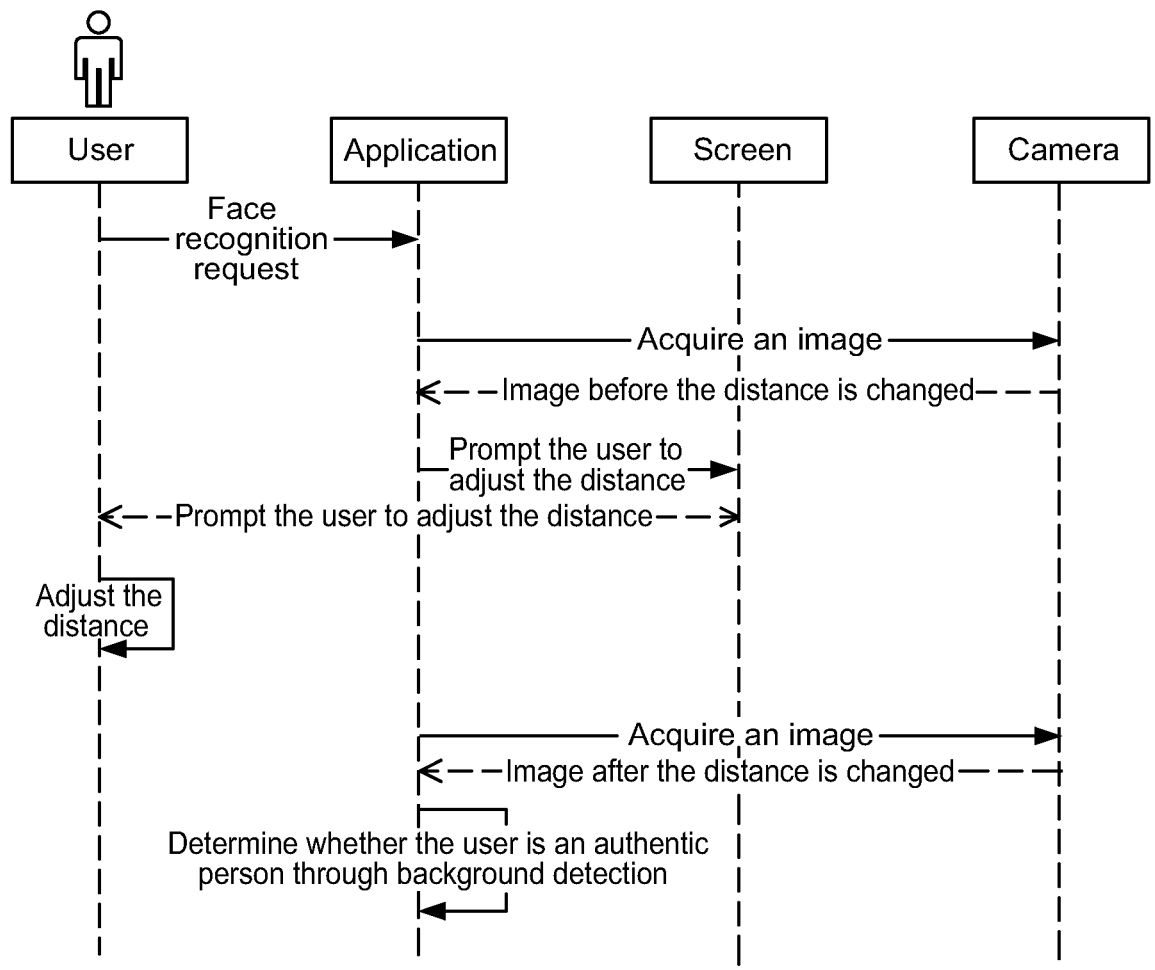
FIG. 11 is a diagram illustrating information interaction in a face recognition process in the present application.

FIG. 11 is a diagram illustrating information interaction in a face recognition process in the present application. It can be seen from the figure that a user initiates a face recognition request through a recognition application; and the recognition application invokes a camera on a mobile terminal or a webcam to photograph a face and a background of the current user and capture a first image. The recognition application displays, on the screen of the mobile terminal, information prompting the user to adjust the distance between the user and the camera; and the user adjusts the position of himself or of the camera according to the prompt information, so as to change the distance between the user and the camera. After the distance is adjusted, the recognition application again instructs the camera to photograph the face and the background of the current user and capture a second image. The recognition application determines whether the current user is an authentic user or an impostor through difference information of a face content and a background content in the first image and the second image.

Embodiment 3

Figure 3:
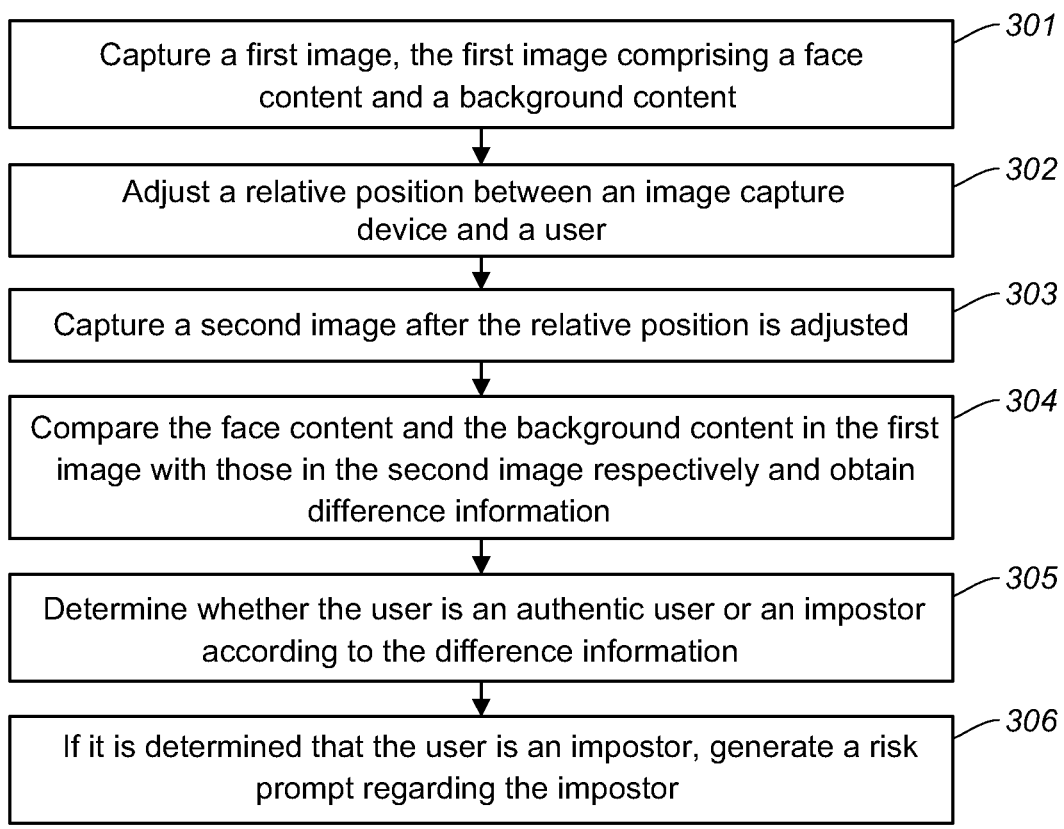
FIG. 3 is a flowchart illustrating steps of an impostor recognition method according to Embodiment 3 of the present application.

Embodiment 3 provides an impostor recognition method. The method may be specifically applied to a mobile terminal. FIG. 3 is a flowchart illustrating steps of an impostor recognition method according to Embodiment 3 of the present application. The method may specifically include the following steps:

Step 301: Capture a first image, the first image comprising a face content and a background content.

Step 302: Adjust a relative position between the image capture device and the user.

Step 303: Capture a second image after the relative position is adjusted.

Step 304: Compare the face content and the background content in the first image with those in the second image respectively and obtain difference information.

Step 305: Determine whether the user is an authentic user or an impostor according to the difference information.

Step 306: If it is determined that the user is an impostor, generating a risk prompt regarding the impostor.

According to this embodiment of the present application, after an impostor is identified, a risk prompt is correspondingly generated to prompt an authentic user to take corresponding precautionary measures, so as to avoid personal information leakage or property loss caused by the consecutive image attack, the video playback attack, or the action simulation software attack of the impostor.

Embodiment 4

Figure 4:
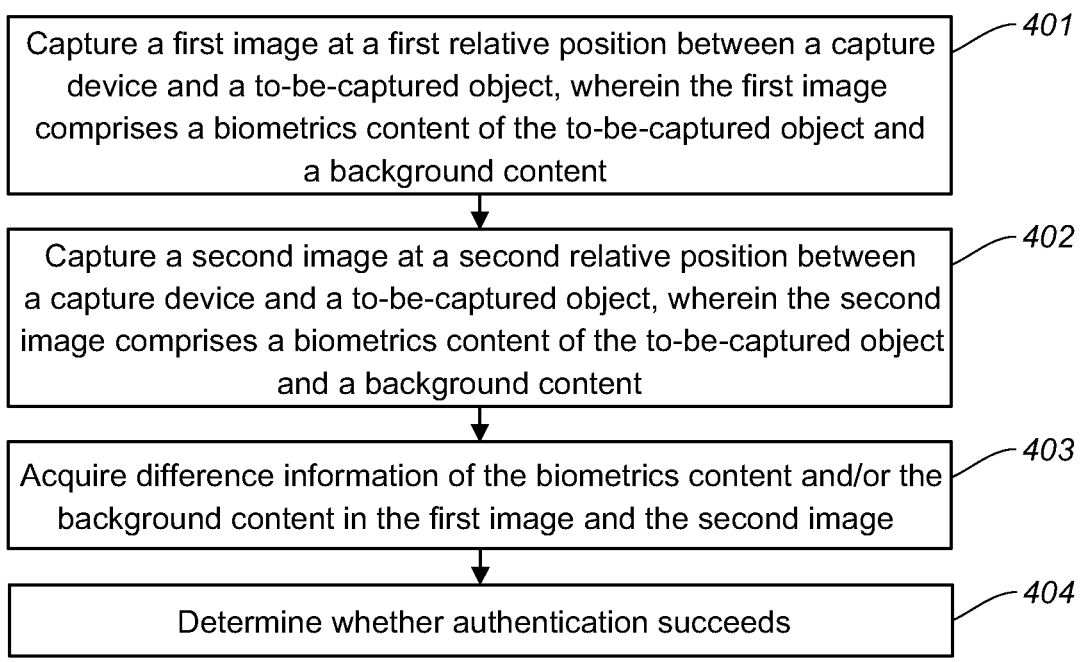
FIG. 4 is a flowchart illustrating steps of a liveness authentication method according to Embodiment 4 of the present application.

Embodiment 4 provides a liveness authentication method. The method may be specifically applied to a mobile terminal. FIG. 4 is a flowchart illustrating steps of a liveness authentication method according to Embodiment 4 of the present application. The method may specifically include the following steps:

Step 401: Capture a first image at a first relative position between a capture device and a to-be-captured object, wherein the first image comprises a biometrics content of the to-be-captured object and a background content.

In specific implementation, the to-be-captured object may be photographed to capture a first image by the capture device at a first relative position with respect to the to-be-captured object. The first image may include a biometrics content of the to-be-captured object and a background content in the background the to-be-captured object is currently in. For example, for authenticating a live user, a face of the user may be captured as a biometrics content, and the scene where the user is in may be captured as a background content.

Step 402: Capture a second image at a second relative position between a capture device and a to-be-captured object, wherein the second image comprises a biometrics content of the tobe-captured object and a background content.

In specific implementation, the to-be-captured object may be instructed to adjust the position between the capture device and the to-be-captured object to a second relative position; and after the position is adjusted, the to-be-captured object may be photographed again so that a second image is captured. The second image may include a biometrics content of the to-be-captured object and background content in the background the to-be-captured object is currently in.

Alternatively, the relative position includes a relative distance between the capture device and the to-be-captured object.

In specific implementation, when the distance between the capture device and the to-be-captured object is a first relative distance, the first image may be captured. When the distance between the capture device and the to-be-captured object is a second relative distance, the second image may be captured. For example, the first image is captured when the capture device is at a distance of 1 meter from the to-be-captured object; and the second image is captured when the capture device is at a distance of 2 meters from the to-be-captured object.

Alternatively, the relative position includes a relative angle between the capture device and the to-be-captured object.

It should be noted that when the capture device performs photographing to capture an image, the line connecting the focus thereof and the capture device is the photographing direction of the capture device. In actual application, the to-be-captured object may not be in the photographing direction of the capture device, so that the to-be-captured object forms a certain angle with the photographing direction of the capture device; that is, a certain angle exists between the to-be-captured object and the capture device.

In specific implementation, when the angle between the capture device and the to-be-captured object is a first relative angle, the first image may be captured. When the angle between the capture device and the to-be-captured object is a second relative distance, the second image may be captured. For example, the first image is captured when the relative angle between the capture device and the to-be-captured object is 10°; and the second image is captured when the relative angle between the capture device and the to-be-captured object is 20°.

Step 403: Acquire difference information of the biometrics content and/or the background content in the first image and the second image.

Step 404: Determine whether liveness authentication succeeds.

in specific implementation, information about the differences between the biometrics content and the background content in the first image and those in the second image may be acquired; or it is determined whether liveness authentication succeeds according to information about the differences between the biometrics content in the first image and that in the second image or according to information about the differences between the background content in the first image and that in the second image.

Alternatively, step 404 includes the following substep: substep S61: determine whether the authentication succeeds according to the difference information.

Alternatively, step 403 may include: acquiring changes in areas between areas occupied by the biometrics content and/or the background content in the first image and those occupied by the biometrics content and/or the background content in the second image;

Substep S61 may include: judging whether ratios of changes in areas between the areas occupied by the biometrics content and the background content in the first image and those occupied by the biometrics content and the background content in the second image are consistent; and if so, determining that the authentication fails; and if not, determining that the authentication succeeds.

In specific implementation, if the to-be-captured object is a living body and when the relative distance changes, a ratio of changes in areas between areas occupied by the biometrics content of the to-be-captured object in the first image and those occupied by the biometrics content of the to-be-captured object in the second image and a ratio of changes in areas between areas occupied by the background content in the first image and those occupied by the background content in the second image should be inconsistent due to the distance change. If the to-be-captured object is a non-living body such as a picture or a video clip, their change ratios would be consistent even if the relative distance changes. The specific example has been described in the foregoing embodiment, and thus will not be described herein again.

Alternatively, step 403 may include: acquiring changes in contents between the biometrics content and/or the background content in the first image and those in the second image; and substep S61 may include: if the biometrics content and/or the background have no changes in contents, determining that the authentication fails; if the biometrics content and/or the background have changes in contents, determining that the authentication succeeds.

In specific implementation, when the relative distance and/or relative angle changes, the biometrics content and the background content have content changes in the first image and the second image; or the biometrics content has a content change; or the background content has a content change. Therefore, it can be determined that the current to-be-captured object is a living body, and it can be determined that the authentication succeeds. When the biometrics content and the background content have no content change, or the biometrics content has no content change, or the background content has no content change, it can be determined that the current to-be-captured object is a non-living body; and therefore it can be determined that the authentication fails.

For example, if the to-be-captured object is a living body, the living body moves around the capture device to change the relative angle for capturing images, or the capture device turns on its own to change the relative angle for capturing images. The living body blocks part of the background content after changing the relative angle, or the photographing direction changes after the capture device changes the relative angle, and both of which causes a content change for the background content in the first image and the second image. However, if the to-be-captured object is a non-live user such as a picture or a video clip, the background content in the picture or the video clip does not change even if the relative angle is changed.

According to this embodiment of the present application, a first image and a second image of an to-be-captured object are respectively captured at a first relative position and a second relative position; information about differences between biometrics content of the to-be-captured object and a background content in the first image and those in the second image is obtained; and whether liveness authentication succeeds is determined according to the difference information, so that a nonliving user can be recognized even if liveness authentication is performed by means of a consecutive image attack, a video playback attack, an action simulation software attack, or the like, thereby solving the problem that current liveness authentication methods cannot recognize non-living users.

It should be noted that with regard to the method embodiments, all of them are expressed as a combination of a series of actions for simplicity of description; but those skilled in the art will recognize that the embodiments of the present application are not limited by the described order of actions as some steps may, in accordance with the embodiments of the present application, be carried out in other orders or simultaneously. Secondly, those skilled in the art should also appreciate that the embodiments described in the specification all belong to the preferred embodiments and that the involved actions are not necessarily required by the embodiments of the present application.

Embodiment 5

Figure 5:
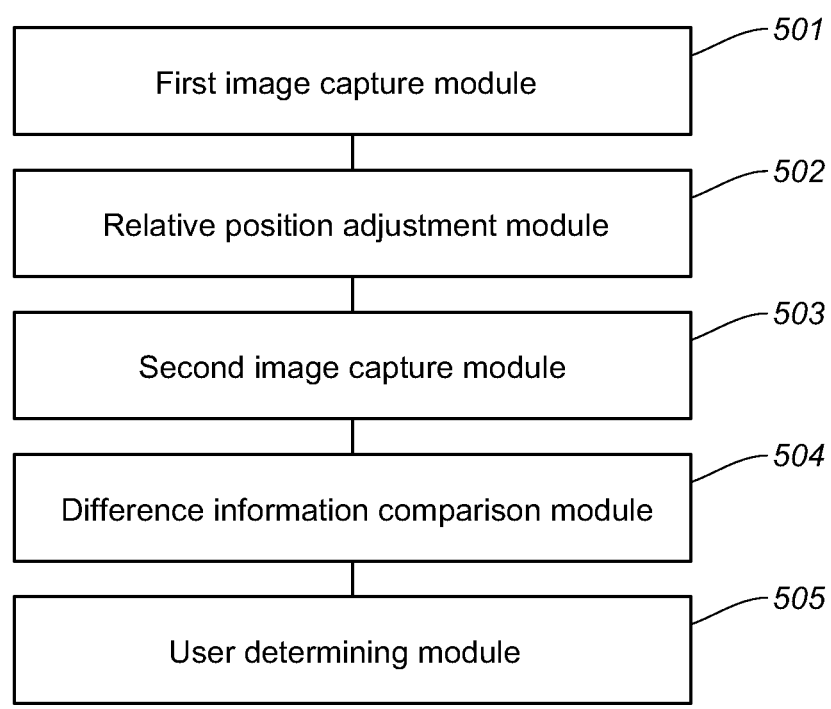
FIG. 5 is a structural block diagram of a face recognition method based on image analysis according to Embodiment 5 of the present application.

In accordance with Embodiment 1, Embodiment 5 provides a face recognition apparatus based on image analysis. The apparatus may be specifically applied to a mobile terminal. FIG. 5 is a structural block diagram of a face recognition method based on image analysis according to Embodiment 5 of the present application. The apparatus may specifically include the following modules:

a first image capture module 501, configured to capture a first image, the first image comprising a face content and a background content;

relative position adjustment module 502, configured to adjust a relative position between an image capture device and a user;

a second image capture module 503, configured to capture a second image after the relative position is adjusted;

a difference information comparison module 504, configured to compare the face content and the background content in the first image with those in the second image respectively and obtain difference information; and a user determining module 505, configured to determine whether the user is an authentic user or an impostor according to the difference information.

According to the embodiments of the present application, a first image and a second image are respectively captured before and after a relative position between an image capture device and a user is adjusted; difference information between a face content and a background content in the first image and those in the second image is compared; and an authentic user or an impostor is determined according to the difference information, so that an impostor can be detected even if the impostor performs face liveness recognition by means of a consecutive image attack, a video playback attack, an action simulation software attack, or the like, thereby solving the problem that current face liveness detection methods cannot recognize impostors.

Embodiment 6

Figure 6:
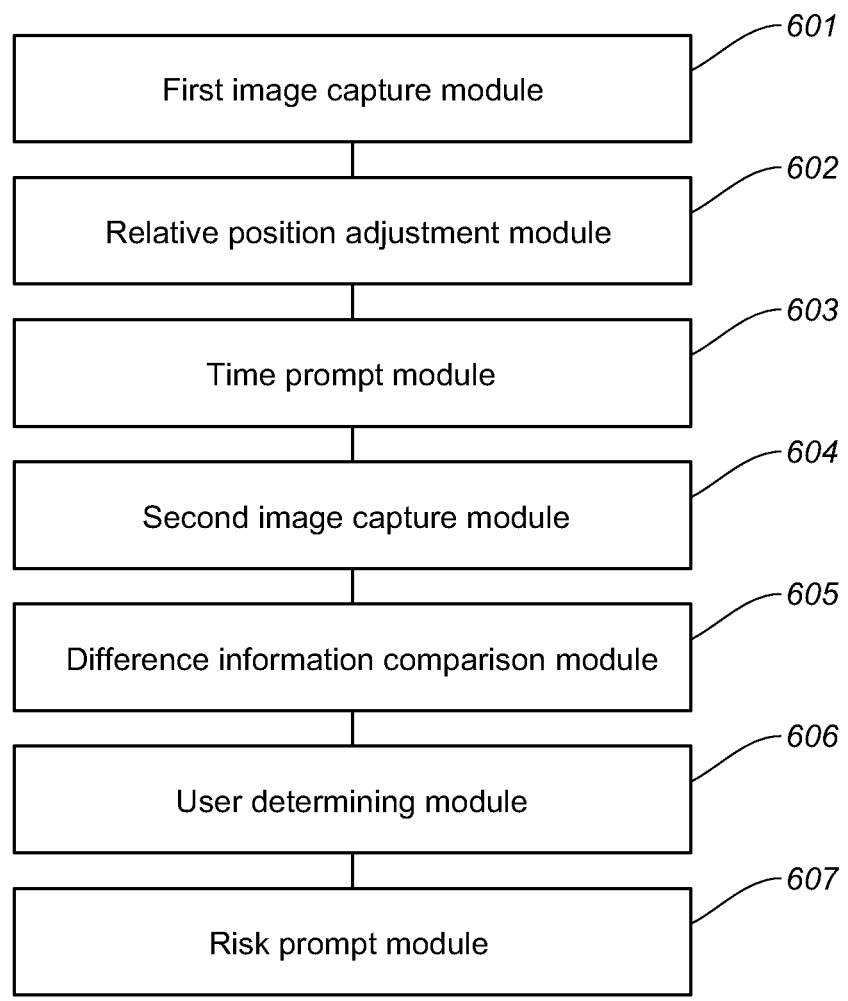
FIG. 6 is a structural block diagram of a face recognition method based on image analysis according to Embodiment 6 of the present application.

In accordance with Embodiment 1, Embodiment 6 provides a face recognition apparatus based on image analysis. The apparatus may be specifically applied to a mobile terminal. FIG. 6 is a structural block diagram of a face recognition method based on image analysis according to Embodiment 6 of the present application. The apparatus may specifically include the following modules:

a first image capture module 601, configured to capture a first image, the first image comprising a face content and a background content;

a relative position adjustment module 602, configured to adjust a relative position between an image capture device and a user;

Step 603: Prompt a time limited for the adjustment, and start timing after the prompting.

a second image capture module 604, configured to capture a second image after the relative position is adjusted;

a difference information comparison module 605, configured to compare the face content and the background content in the first image with those in the second image respectively and obtain difference information; and a user determining module 606, configured to determine whether the user is an authentic user or an impostor according to the difference information; and a risk prompt module 607, configured to, if it is determined that the user is an impostor, generate a risk prompt regarding the impostor.

Alternatively, the second image capture module 604 includes: a second image capture submodule, configured to capture the second image after the time limit for the adjustment is reached.

Alternatively, the relative position adjustment module 602 includes: a position adjustment submodule, configured to adjust a position of the image capture device or prompting to adjust a position of the user.

Alternatively, the adjusting comprises adjustment in at least one direction in a horizontal line connecting the image capture device and the use; and the difference information comparison module 605 includes: an area change comparison submodule, configured to compare changes in areas between the areas occupied by the face content and the background content in the first image with those occupied by the face content and the background content in the second image respectively and obtain changes in areas.

Alternatively, the user determining module 606 includes: a ratio consistency judgment submodule, configured to judge whether ratios of changes in areas between the areas occupied by the face content and the background content in the first image and those occupied by the face content and the background content in the second image are consistent; and a first impostor determining submodule, configured to determine that the user is an impostor if the judging result is positive.

Alternatively, the adjusting comprises adjustment in at least one direction within a plane perpendicular to the image capture device and the user; and the difference information comparison module 605 includes: a content change comparison submodule, configured to compare changes in contents between the face content and the background content in the first image with those in the second image respectively and obtain changes in contents.

Alternatively, the user determining module 606 includes: a second impostor determining submodule, configured to determine that the user is an impostor if both the face content and the background have no changes in contents.

Alternatively, the apparatus further includes: a pointing direction adjustment module, configured to adjust a direction in which the image capture device is pointing to the user.

Alternatively, the apparatus further includes: a background object selection module, configured to select a background object having a clear boundary from the background content; the difference information comparison module 605 includes: a difference information comparison submodule, configured to compare the face content and the background object in the first image with those in the second image respectively and obtain difference information.

According to this embodiment of the present application, a background object having a clear boundary is selected from the background content; difference information between the face content and the background object in the first image and those in the second image is compared; and the user is determined to be an authentic user or an impostor according to the difference information, so as to avoid obtaining wrong difference information due to an object content having a fuzzy boundary, thereby improving the accuracy of identifying an authentic user or an impostor.

Embodiment 7

Figure 7:
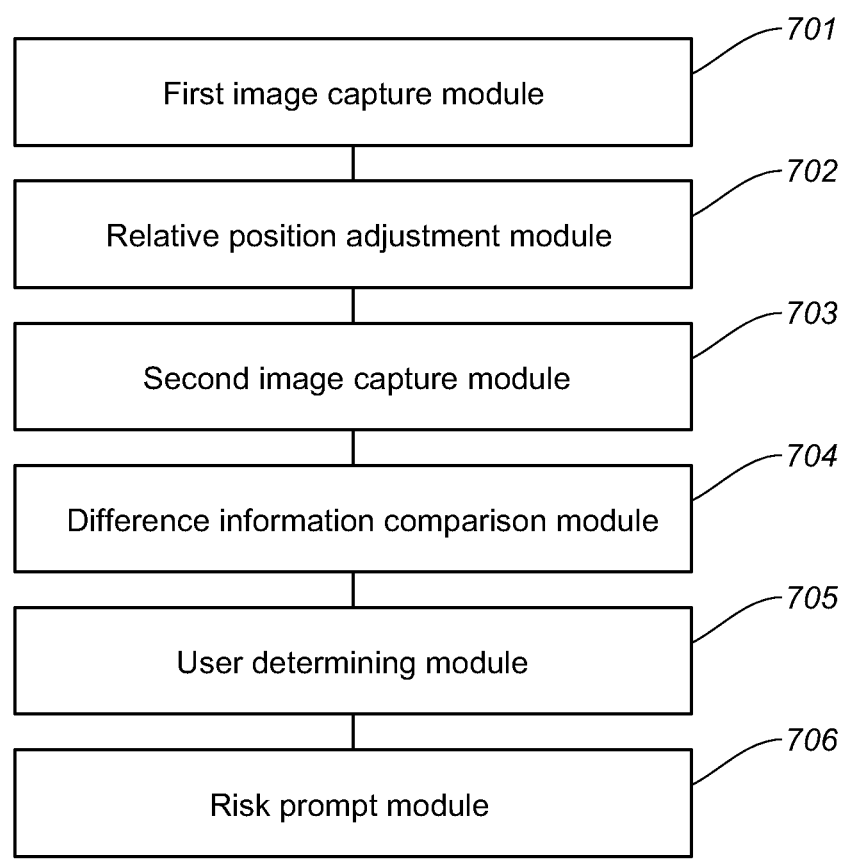
FIG. 7 is a structural block diagram of an impostor recognition apparatus according to Embodiment 7 of the present application.

In accordance with Embodiment 3, Embodiment 7 provides an impostor recognition apparatus. The apparatus may be specifically applied to a mobile terminal. FIG. 7 is a structural block diagram of an impostor recognition apparatus according to Embodiment 7 of the present application. The apparatus may specifically include the following modules:

a first image capture module 701, configured to capture a first image, the first mage comprising a face content and a background content;

a relative position adjustment module 702, configured to adjust a relative position between an image capture device and a user;

a second image capture module 703, configured to capture a second image after the relative position is adjusted;

a difference information comparison module 704, configured to compare the face content and the background content in the first image with those in the second image respectively and obtain difference information; and a user determining module 705, configured to determine whether the user is an authentic user or an impostor according to the difference information.

a risk prompt module 706, configured to, if it is determined that the user is an impostor, generate a risk prompt regarding the impostor.

According to this embodiment of the present application, after an impostor is identified, a risk prompt is correspondingly generated to prompt an authentic user to take corresponding precautionary measures, so as to avoid personal information leakage or property loss caused by the consecutive image attack, the video playback attack, or the action simulation software attack of the impostor.

Embodiment 8

Figure 8:
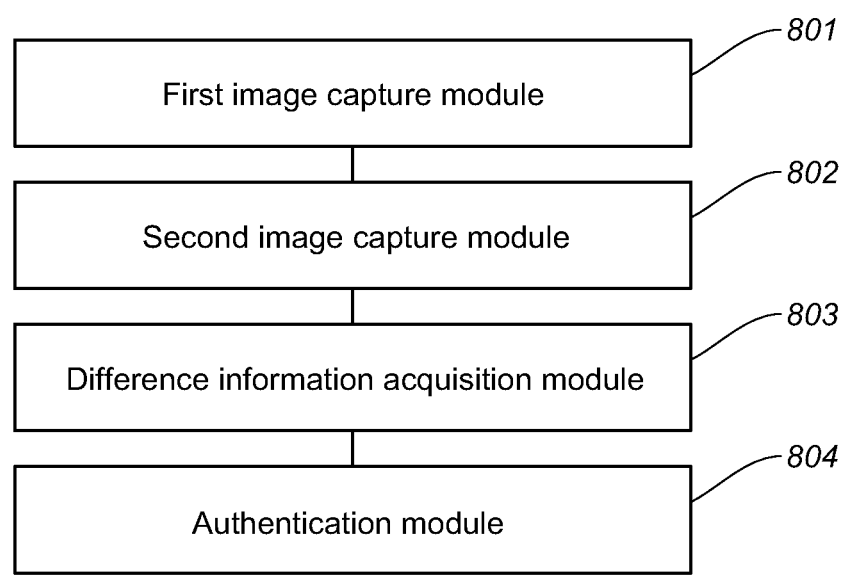
FIG. 8 is a structural block diagram of an authentication apparatus according to Embodiment 8 of the present application.

In accordance with Embodiment 4, Embodiment 8 provides an authentication apparatus. The apparatus may be specifically applied to a mobile terminal. FIG. 8 is a structural block diagram of an authentication apparatus according to Embodiment 8 of the present application. The apparatus may specifically include the following modules:

first image capture module 801, configured to capture a first image at a first relative position between a capture device and a to-be-captured object, wherein the first image comprises a biometrics content of the to-be-captured object and a background content;

a second image capture module 802, configured to capture a first image at a first relative position between a capture device and a to-be-captured object, wherein the first image comprises a biometrics content of the to-be-captured object and a background content;

a difference information acquisition module 803, configured to acquire difference information of the biometrics content and/or the background content in the first image and the second image; and an authentication module 804, configured to determine whether authentication succeeds.

Alternatively, the relative position includes a relative distance between the capture device and the to-be-captured object.

Alternatively, the relative position includes a relative angle between the capture device and the to-be-captured object.

Alternatively, the authentication module 804 includes: a difference determining submodule, configured to determine whether the authentication succeeds according to the difference information.

Alternatively, the difference information acquisition module 803 includes: an area change acquisition submodule, configured to acquire changes in areas between areas occupied by the biometrics content and/or the background content in the first image and those occupied by the biometrics content and/or the background content in the second image; and the difference determining submodule includes:

a change ratio judgment unit, configured to judge whether ratios of changes in areas between the areas occupied by the biometrics content and the background content in the first image and those occupied by the biometrics content and the background content in the second image are consistent; if so, invoke a first authentication failure determining unit; and if not, invoke a first authentication success determining unit; and the first authentication failure determining unit, configured to determine that the authentication fails; and the first authentication success determining unit, configured to determine that the authentication succeeds.

Alternatively, the difference information acquisition module 803 includes:

a content change acquisition submodule, configured to acquire changes in contents between the biometrics content and/or the background content in the first image and those in the second image; and the difference determining submodule includes:

a second authentication failure determining unit, configured to do the following: if the biometrics content and/or the background have no changes in contents, determine that the authentication fails; and a second authentication success determining unit, configured to do the following: if the biometrics content and/or the background have changes in contents, determine that the authentication succeeds.

According to this embodiment of the present application, a first image and a second image of an to-be-captured object are respectively captured at a first relative position and a second relative position; information about differences between biometrics content of the to-be-captured object and a background content in the first image and those in the second image is obtained; and whether liveness authentication succeeds is determined according to the difference information, so that a nonliving user can be recognized even if liveness authentication is performed by means of a consecutive image attack, a video playback attack, an action simulation software attack, or the like, thereby solving the problem that current liveness authentication methods cannot recognize non-living users.

Embodiment 9

Figure 9:
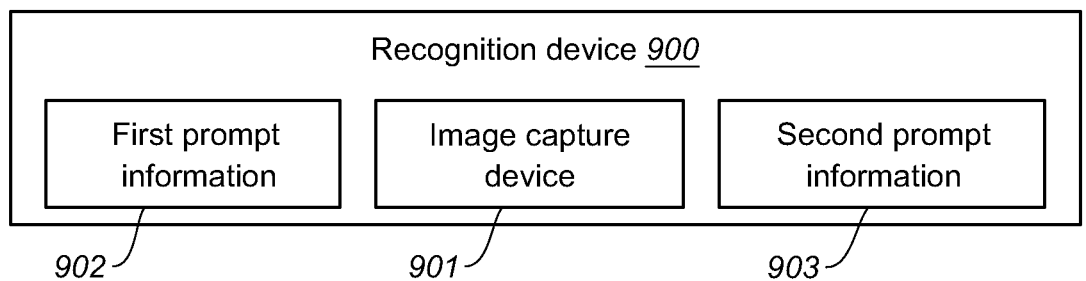
FIG. 9 is a structural block diagram of a recognition device according to Embodiment 8 of the present application.

Embodiment 9 provides a recognition device. FIG. 9 is a structural block diagram of a recognition device according to Embodiment 8 of the present application. The recognition device 900 includes an image capture device 901, first prompt information 902, and second prompt information 903.

The image capture device 901 is configured to capture a first image, the first image comprising a face content and a background content.

The first prompt information 902 is configured to show a prompt for adjusting a relative position between the image capture device and a user.

The image capture device 901 is further configured to capture a second image after the relative position is adjusted.

The recognition device 900 is configured to compare the face content and the background content in the first image with those in the second image respectively and obtain difference information, and determine that the user is an authentic user or an impostor according to the difference information.

The second prompt information 903 is configured to, if it is determined that the user is an impostor, generate a risk prompt regarding the impostor.

According to the embodiments of the present application, a first image and a second image are respectively captured before and after a relative position between an image capture device and a user is adjusted; difference information between a face content and a background content in the first image and those in the second image is compared; and an authentic user or an impostor is determined according to the difference information, so that an impostor can be detected even if the impostor performs face liveness recognition by means of a consecutive image attack, a video playback attack, an action simulation software attack, or the like, thereby solving the problem that current face liveness detection methods cannot recognize impostors.

According to this embodiment of the present application, after an impostor is identified, a risk prompt is correspondingly generated to prompt an authentic user to take corresponding precautionary measures, so as to avoid personal information leakage or property loss caused by the consecutive image attack, the video playback attack, or the action simulation software attack of the impostor.

With regard to the apparatus embodiments, because the apparatus embodiments are substantially similar to the method embodiments, the description is relatively concise, and reference can be made to the description of the method embodiments for related parts.

Figure 10:
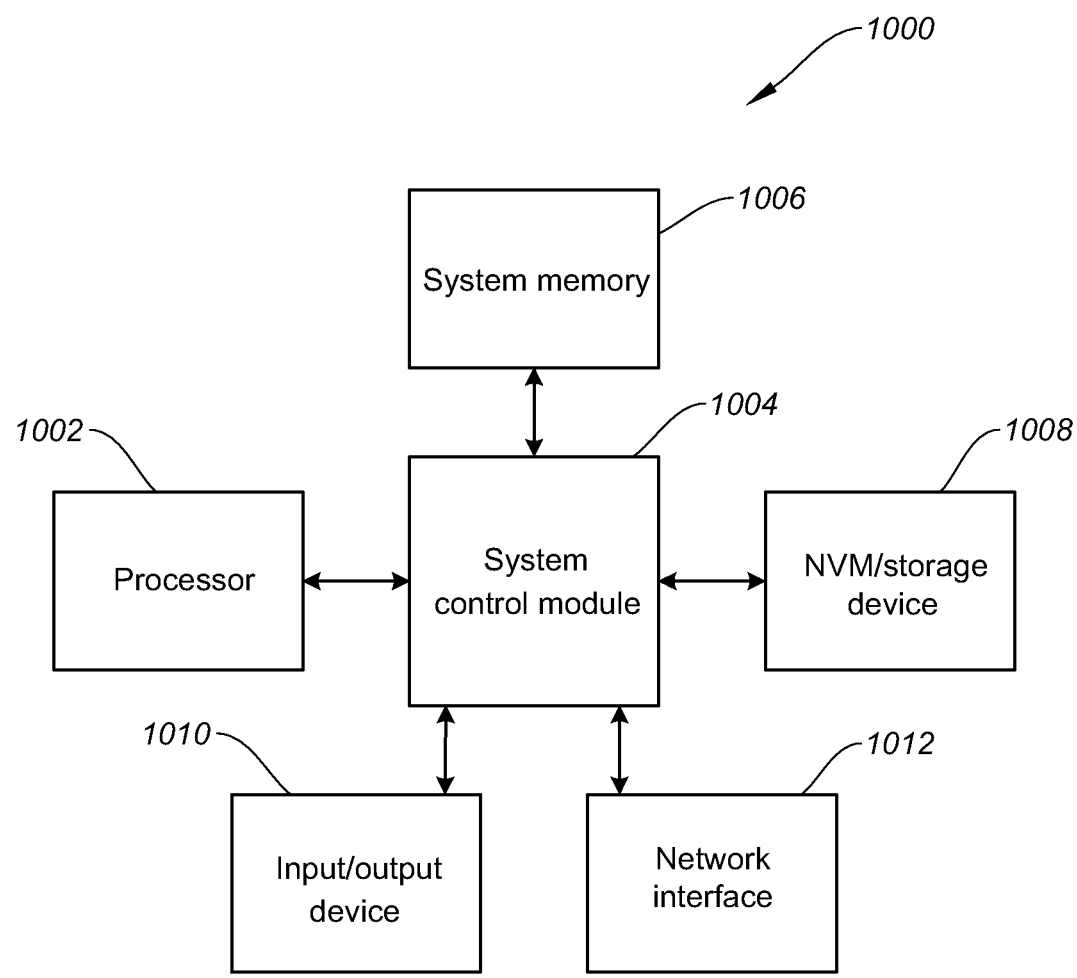
FIG. 10 illustrates an exemplary system in the present application implementing various embodiments described in the present disclosure.

The embodiments of the present disclosure can be implemented as a system that uses any suitable hardware, firmware, or software, or any combination thereof to perform desired configuration. FIG. 10 schematically illustrates an exemplary system (or apparatus) 1000 that can be used to implement various embodiments described in the present disclosure.

For one embodiment, FIG. 10 illustrates the exemplary system 1000. The system has one or more processors 1002; at least one system control module (chip set) 1004 coupled to the processor(s) 1002; a system memory 1006 coupled to the system control module 1004; a nonvolatile memory (NVM)/storage device 1008 coupled to the system control module 1004; one or more input/output devices 1010 coupled to the system control module 1004; and a network interface 1012 coupled to the system control module 1006.

The processors 1002 may include one or more single-core or multi-core processors. The processors 1002 may include any combination of general purpose processors or special purpose processors (for example, graphics processors, application processors, or baseband processors). In some embodiments, the system 1000 can be used as a browser as described in the embodiments of the present application.

In some embodiments, the system 1000 may include one or more computer-readable media (for example, the system memory 1006 or NVM/storage device 1008) having instructions and one or more processors 1002 coupled to the one or more computer-readable media and configured to execute the instructions to implement modules so as to perform actions described in the present disclosure.

For one embodiment, the system control module 1004 may include any suitable interface controller to provide any suitable interface to at least one of the processor(s) 1002 and/or to any suitable device or component in communication with the system control module 1004.

The system control module 1004 may include a memory controller module to provide an interface to the system memory 1006. The memory controller module may be a hardware module, a software module, and/or a firmware module.

The system memory 1006 may be used to load and store data and/or instructions, for example, for the system 1000. For one embodiment, the system memory 1006 may include any suitable volatile memory, such as a suitable DRAM. In some embodiments, the system memory 1006 may include a double data rate type 4 synchronous dynamic random access memory (DDR4 SDRAM).

For one embodiment, the system control module 1004 may include one or more input/output controllers to provide an interface to the NVM/storage device 1008 and the input/output device(s) 1010. For example, the NVM/storage device 1008 may be used to store data and/or instructions. The NVM/storage device 1008 may include any suitable non-volatile memory (for example, a flash memory) and/or may include any suitable non-volatile storage device(s) (for example, one or more hard disk drives (HDDs), one or more compact disc (CD) drives, and/or one or more digital versatile disc (DVD) drives).

The NVM/storage device 1008 may include a storage resource that physically forms a part of a device on which the system 1000 is installed; or it may be accessible by the device and not necessarily being a part of the device. For example, the NVM/storage device 1008 may be accessed over a network via the input/output device(s) 1010.

The input/output device(s) 1010 may provide an interface for the system 1000 to communicate with any other suitable device. The input/output devices 1010 may include a communication component, an audio component, a sensor component, and the like. The network interface 1012 may provide an interface for the system 1000 to communicate through one or more networks. The system 1000 may wirelessly communicate with one or more components of a wireless network in accordance with any of one or more wireless network standards and/or protocols. such as accessing a wireless network based on a communication standard like WiFi, 2G, or 3G or a combination thereof to perform wireless communication.

For one embodiment, at least one of the processor(s) 1002 may be packaged together with logic of one or more controllers (for example, the memory controller module) of the system control module 1004. For one embodiment, at least one of the processor(s) 1002 may be packaged together with logic of one or more controllers of the system control module 1004 to form a System in Package (SiP). For one embodiment, at least one of the processor(s) 1002 may be integrated on the same die with logic of one or more controllers of the system control module 1004. For one embodiment, at least one of the processor(s) 1002 may be integrated on the same die with logic of one or more controllers of the system control module 1004 to form a System on Chip (SoC).

In various embodiments, the system 1000 may be, but is not limited to, a browser, a workstation, a desktop computing device, or a mobile computing device (for example, a laptop computing device, a hand-held computing device, a tablet computer, or a netbook). In various embodiments, the system 1000 may have more or fewer components and/or different architectures. For example, in some embodiments, the system 1000 includes one or more of a camera, a keyboard, a liquid crystal display (LCD) screen (including a touch screen display), a non-volatile memory port, multiple antennas, a graphics chip, an application specific integrated circuit (ASIC), and a speaker.

If the display includes a touch panel, a display screen may be implemented as a touch screen display to receive input signals from a user. The touch panel includes one or more touch sensors to sense touches, swipes, and gestures on the touch panel. The touch sensors may not only sense a boundary of a touch or swipe action, but also detect a period of time and a pressure related to the touch or swipe operation.

An embodiment of the present application further provides a non-volatile readable storage medium, where the storage medium stores one or more modules (programs), which, when applied to a terminal device, enable the terminal device to execute instructions of various method steps in the embodiments of the present application.

In one example, a computer device is provided, which includes a memory, a processor, and a computer program stored on the memory and capable of running on the processor, wherein the processor, when executing the computer program, implements the methods according to the embodiments of the present application.

One example further provides a computer-readable storage medium, having a computer program stored thereon, wherein the program, when executed by a processor, implements the one or more methods according to the embodiments of the present application.

The embodiments of the present application disclose a face recognition method and apparatus based on image analysis. Example 1 includes a face recognition method based on image analysis, which includes:

capturing a first image, the first image comprising a face content and a background content;

adjusting a relative position between an image capture device and a user;

capturing a second image after the relative position is adjusted;

comparing the face content and the background content in the first image with those in the second image respectively and obtaining difference information; and determining whether the user is an authentic user or an impostor according to the difference information.

Example 2 may include the method described in Example 1, wherein the adjusting a relative position between an image capture device and a user includes: adjusting a position of the image capture device or prompting to adjust a position of the user.

Example 3 may include the method described in Example 1, wherein the adjusting comprises adjustment in at least one direction in a horizontal line connecting the image capture device and the user; and the comparing the face content and the background content in the first image with those in the second image respectively and obtaining difference information comprises: comparing changes in areas between the areas occupied by the face content and the background content in the first image with those occupied by the face content and the background content in the second image respectively and obtaining changes in areas.

Example 4 may include the method described in Example 3, wherein the determining whether the user is an authentic user or an impostor according to the difference information includes:

judging whether ratios of changes in areas between the areas occupied by the face content and the background content in the first image and those occupied by the face content and the background content in the second image are consistent; and if so, determining that the user is an impostor.

Example 5 may include the method described in Example 1, wherein the adjusting includes adjustment in at least one direction within a plane perpendicular to the image capture device and the user; and the comparing the face content and the background content in the first image with those in the second image respectively and obtaining difference information comprises: comparing changes in contents between the face content and the background content in the first image with those in the second image respectively and obtaining changes in contents.

Example 6 may include the method described in Example 5, wherein the determining whether the user is an authentic user or an impostor according to the difference information includes: if both the face content and the background have no changes in contents, determining that the user is an impostor.

Example 7 may include the method described in Example 5, wherein before the capturing a second image after the relative position is adjusted, the method further includes: adjusting a direction in which the image capture device is pointing to the user.

Example 8 may include the method described in any one of Examples 1 to 7, wherein before the comparing the face content and the background content in the first image with those in the second image and obtain difference information, the method further includes:

selecting a background object having a clear boundary from the background content;

the comparing the face content and the background content in the first image with those in the second image respectively and obtaining difference information comprises:

comparing the face content and the background object in the first image with those in the second image and obtain difference information.

Example 9 may include the method described in Example 2, wherein when the adjusting a relative position between an image capture device and a user is prompting the position of the user, the method further includes:

prompting a time limited for the adjustment, and starting timing after the prompting; and the capturing a second image after the relative position is adjusted comprises: capturing the second image after the time limit for the adjustment is reached.

Example 10 may include the method described in Example 1, wherein the method further includes: if it is determined that the user is an impostor, generating a risk prompt regarding the impostor.

Example 11 may include a face recognition apparatus based on image analysis, which includes:

a first image capture module, configured to capture a first image, the first image comprising a face content and a background content;

a relative position adjustment module, configured to adjust a relative position between an image capture device and a user;

a second image capture module, configured to capture a second image after the relative position is adjusted;

a difference information comparison module, configured to compare the face content and the background content in the first image with those in the second image respectively and obtain difference information; and a user determining module, configured to determine whether the user is an authentic user or an impostor according to the difference information.

Example 12 may include the apparatus described in Example 11, wherein the relative position adjustment module includes: a position adjustment submodule, configured to adjust a position of the image capture device or prompting to adjust a position of the user.

Example 13 may include the apparatus described in Example 11, wherein the adjusting comprises adjustment in at least one direction in a horizontal line connecting the image capture device and the user; and the difference information comparison module includes:

an area change comparison submodule, configured to compare changes in areas between the areas occupied by the face content and the background content in the first image with those occupied by the face content and the background content in the second image respectively and obtain changes in areas.

Example 14 may include the apparatus described in Example 13, wherein the difference information comparison module includes:

a ratio consistency judgment submodule, configured to judge whether ratios of changes in areas between the areas occupied by the face content and the background content in the first image and those occupied by the face content and the background content in the second image are consistent; and a first impostor determining submodule, configured to determine that the user is an impostor if the judging result is positive.

Example 15 may include the apparatus described in Example 11, wherein the adjusting includes adjustment in at least one direction within a plane perpendicular to the image capture device and the user; and the difference information comparison module includes: a content change comparison submodule, configured to compare changes in contents between the face content and the background content in the first image with those in the second image respectively and obtain changes in contents.

Example 16 may include the apparatus described in Example 15, wherein the user determining module includes: a second impostor determining submodule, configured to determine that the user is an impostor if both the face content and the background have no changes in contents.

Example 17 may include the apparatus described in Example 15, wherein the apparatus further includes: a pointing direction adjustment module, configured to adjust a direction in which the image capture device is pointing to the user.

Example 18 may include the apparatus described in any one of Examples 11 to 17, wherein the apparatus further includes:

a background object selection module, configured to select a background object having a clear boundary from the background content;

the difference information comparison module includes: a difference information comparison submodule, configured to compare the face content and the background object in the first image with those in the second image respectively and obtain difference information.

Example 19 may include the apparatus described in Example 12, wherein when the adjusting a relative position between an image capture device and a user is prompting the position of the user, the apparatus further includes: a time prompt module, configured to prompt a time limited for the adjustment, and starting timing after the prompting; and the second image capture module includes: a second image capture submodule, configured to capture the second image after the time limit for the adjustment is reached.

Example 20 may include the apparatus described in Example 11, wherein the apparatus further includes: a risk prompt module, configured to, if it is determined that the user is an impostor, generate a risk prompt regarding the impostor.

Example 21: A computer device, comprising a memory, a processor, and a computer program stored on the memory and capable of running on the processor, wherein the processor, when executing the computer program, implements the one or more methods according to claims 1 to 10.

Example 22: A computer-readable storage medium, having a computer program stored thereon, wherein the program, when executed by a processor, implements the one or more methods according to claims 1 to 10.

Although some embodiments are provided for the purpose of explanation and description, various replacements and/or equivalent implementation solutions or computations that achieve the implementation shown and described in the embodiments with the same purpose do not depart from the implementation scope of the present application. The present application is intended to cover any modifications or changes to the embodiments discussed herein. Therefore, it is apparent that the embodiments described herein are only defined by the claims and their equivalents.

Although some embodiments are provided for the purpose of explanation and description, various replacements and/or equivalent implementation solutions or computations that achieve the implementation shown and described in the embodiments with the same purpose do not depart from the implementation scope of the present application. The present application is intended to cover any modifications or changes to the embodiments discussed herein. Therefore, it is apparent that the embodiments described herein are only defined by the claims and their equivalents.

Various embodiments in the specification are described in a progressive way, each embodiment focuses on the differences one has from others; and for the same or similar parts between various embodiments, reference may be made to the description of other embodiments.

Those skilled in the art should note that embodiments of the present application may be provided as a method, an apparatus, or a computer program product. Therefore, an embodiment of the present application may use forms of a full hardware embodiment, a full software embodiment, or an embodiment combining software and hardware aspects. Moreover, an embodiment of the present application may employ the format of a computer program product implemented on one or more computer usable storage media (including, but not limited to, a magnetic disk memory, a CD-ROM, an optical memory, and so on) containing computer usable program code therein.

In a typical configuration, the computer device includes one or more processors (CPUs), input/output interfaces, network interfaces, and memories. The memory may include computer readable medium in the form of non-permanent memory, random access memory (RAM) and/or non-volatile memory or the like, such as read-only memory (ROM) or flash memory (flash RAM). The memory is an example of a computer-readable medium. The computer-readable medium includes permanent and non-permanent, movable and non-movable media that can achieve information storage by means of any methods or techniques. The information may be computer-readable instructions, data structures, modules of programs or other data. Examples of the computer storage medium include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disk (DVD) or other optical storages, magnetic cassette, magnetic tape, magnetic disk storage or other magnetic storage devices, or any other non-transmission medium that can be used for storing information accessible by a computing device. In light of the definitions herein, the computer readable medium does not include transitory computer readable media (transitory media), such as modulated data signals and carrier waves.

The embodiments of the present application are described with reference to flow charts and/or block diagrams according to the method, terminal device (system) and computer program product according to the embodiments of the present application. It should be understood that each flow and/or block in the flowcharts and/or block diagrams, and a combination of flows and/or blocks in the flowcharts and/or block diagrams can be implemented with computer program instructions. These computer program instructions may be provided to a general purpose computer, a special-purpose computer, an embedded processor, or a processor of any other programmable data processing terminal device to generate a machine, so that the instructions executed by a computer or a processor of any other programmable data processing terminal device generate an apparatus for implementing a specified function in one or more processes in the flowcharts and/or in one or more blocks in the block diagrams.

These computer program instructions may also be stored in a computer-readable memory that can direct a computer or another programmable data processing terminal device to operate in a particular manner, such that the instructions stored in the computer-readable memory produce an article of manufacture including instruction means, the instruction means implementing the functions specified in one or more flows of the flowcharts and/or one or more blocks of the block diagrams.

These computer program instructions may also be loaded onto a computer or another programmable data processing terminal device such that a series of operational steps are performed on the computer or another programmable terminal device to produce a computer implemented processing, and thus the instructions executed on the computer or another programmable terminal device provide the steps for implementing the functions specified in one or more flows of the flowcharts and/or one or more blocks of the block diagrams.

Preferred embodiments of the embodiments of the present application have been described; however, once knowing basic creative concepts, those skilled in the art can make other variations and modifications on these embodiments. Therefore, the appended claims are intended to be interpreted as including the preferred embodiments and all variations and modifications falling within the scope of the embodiments of the present application.

Finally, it should be further noted that, in this text, the relation terms such as first and second are merely used to distinguish one entity or operation from another entity or operation, and do not require or imply that the entities or operations have this actual relation or order. Moreover, the terms "include", "comprise" or other variations thereof are intended to cover non-exclusive inclusion, so that a process, a method, an article or a terminal device including a series of elements not only includes the elements, but also includes other elements not clearly listed, or further includes inherent elements of the process, method, article or terminal device. In a case without any more limitations, an element defined by "including a/an . . . " does not exclude that the process, method, article or terminal device including the element further has other identical elements.

The technical solutions provided in the present application are introduced in detail above, and the principles and implementations of the present application are described by applying specific examples in this text. The above descriptions on the embodiments are merely used to help understand the method of the present application and core ideas thereof. Meanwhile, for those of ordinary skill in the art, modifications may be made on the specific implementations and application scopes according to the idea of the present application. In view of the above, the content of the description should not be construed as any limitation to the present application.

What is claimed is:

1. A face recognition method based on image analysis, the face recognition method comprising:
  capturing a first image by an image capture device, the first image comprising a first face content of a user and a first background content;
  adjusting a relative position between the image capture device and the user;
  capturing a second image after the relative position is adjusted, the second image comprising a second face content of the user and a second background content;
  comparing the first face content and the first background content in the first image with the second face content and the second background content in the second image, respectively, and obtaining difference information based on the comparison; and
  determining whether the user is an authentic user or an impostor according to the difference information.

2. The face recognition method according to claim 1, wherein the adjusting a relative position between an image capture device and a user comprises:
  adjusting a position of the image capture device or prompting to adjust a position of the user.

3. The face recognition method according to claim 1, wherein:
  the adjusting comprises adjustment in at least one direction in a horizontal line connecting the image capture device and the user; and
  the comparing the first face content and the first background content in the first image with the second face content and the second background content in the second image, respectively, and obtaining difference information based on the comparison, comprises:
    comparing areas occupied by the first face content and the first background content in the first image with areas occupied by the second face content and the second background content in the second image, respectively, and obtaining changes in areas based on the comparison of areas.

4. The face recognition method according to claim 3, wherein the determining whether the user is an authentic user or an impostor according to the difference information comprises:
  judging whether ratios of the changes in areas between the areas occupied by the first face content and the first background content in the first image and the areas occupied by the second face content and the second background content in the second image are consistent; and
  if so, determining that the user is an impostor.

5. The face recognition method according to claim 1,
  wherein the adjusting comprises:
    adjustment in at least one direction within a plane perpendicular to the image capture device and the user; and
  wherein the comparing the first face content and the first background content in the first image with the second face content and the second background content in the second image, respectively, and obtaining difference information based on the comparison comprises:

comparing the first face content and the first background content in the first image with the second face content and the second background content in the second image, respectively, and obtaining changes in contents based on the comparison of contents.

6. The face recognition method according to claim 5, wherein the determining whether the user is an authentic user or an impostor according to the difference information comprises:
if there are no changes in contents between the first face content and the second face content, and between the first background content and the second background content, determining that the user is an impostor.

7. The face recognition method according to claim 5, wherein before the capturing a second image after the relative position is adjusted, the method further comprises:
adjusting a direction in which the image capture device is pointing to the user.

8. The face recognition method according to claim 1, wherein before the comparing the first face content and the first background content in the first image with the second face content and the second background content in the second image, respectively, and obtaining difference information based on the comparison, the method further comprises:
selecting a background object having a clear boundary from the first background content and the second background content; and
wherein the comparing the first face content and the first background content in the first image with the second face content and the second background content in the second image, respectively, and obtaining difference information based on the comparison, comprises:
comparing the first face content and the background object in the first image with the second face content and the background object in the second image, respectively, and obtaining, the difference information based on the comparison of contents.

9. The face recognition method according to claim 2, wherein when the adjusting a relative position between an image capture device and a user, the method further comprises:
prompting a time limited for the adjustment, and starting timing after the prompting; and
wherein the capturing a second image after the relative position is adjusted comprises:
capturing the second image after the time limit for the adjustment is reached.

10. The face recognition method according to claim 1, further comprising:
if it is determined that the user is an impostor, generating a risk prompt regarding the impostor.

11. An impostor recognition method comprising:
capturing a first image by an image capture device, the first image comprising a face content of a user and a background content;
adjusting a position of the image capture device relative to the user;
capturing a second image after the relative position is adjusted, the second image comprising a second face content of the user and a second background content;
comparing the face content and the background content in the first image with the second face content and the second background content in the second image, respectively, and obtaining difference information based on the comparison;

determining whether the user is an authentic user or an impostor according to the difference information; and
if it is determined that the user is an impostor, generating a risk prompt regarding the impostor.

12. A face recognition apparatus based on image analysis, the face recognition apparatus comprising:
a first image capture module, configured to capture a first image, the first image comprising a face content of a user and a background content;
a relative position adjustment module, configured to adjust a relative position between an image capture device and the user;
a second image capture module, configured to capture a second image after the relative position is adjusted, the second image comprising a second face content of the user and a second background content;
a difference information comparison module, configured to compare the face content and the background content in the first image with the second face content and the second background content in the second image, respectively, and obtain difference information based on the comparison; and
a user determining module, configured to determine whether the user is an authentic user or an impostor according to the difference information.

13. An impostor recognition apparatus comprising:
a first image capture module, configured to capture a first image, the first image comprising a face content of a user and a background content;
a relative position adjustment module, configured to adjust a relative position between an image capture device and a user;
a second image capture module, configured to capture a second image after the relative position is adjusted, the second image comprising a second face content of the user and a second background content;
a difference information comparison module, configured to compare the face content and the background content in the first image with the second face content and the second background content in the second image, respectively, and obtain difference information based on the comparison;
a user determining module, configured to determine whether the user is an authentic user or an impostor according to the difference information; and
a risk prompt module, configured to, if it is determined that the user is an impostor, generate a risk prompt regarding the impostor.

14. A device comprising:
a recognition device comprising an image capture device, first prompt information, and second prompt information,
wherein the image capture device is configured to capture a first image, the first image comprising a face content of a user and a background content;
wherein the first prompt information is configured to show a prompt for adjusting a relative position between the image capture device and the user;
wherein the image capture device is further configured to capture a second image after the relative position is adjusted, the second image comprising a second face content of the user and a second background content;
wherein the recognition device is configured to compare the face content and the background content in the first image with the second face content and the second background content in the second image, respectively, and obtain difference information based on the comparison, and determine that the user is an authentic user or an impostor according to the difference information; and wherein the second prompt information is configured to, if it is determined that the user is an impostor, generate a risk prompt regarding the impostor.

15. A computer device, comprising a non-transitory computer-readable storage medium, a processor, and a computer program stored on the non-transitory computer-readable storage medium and capable of running on the processor, wherein the processor, when executing the computer program, implements a method according to claim 1.

16. A non-transitory computer-readable storage medium, having a computer program stored thereon, wherein the program, when executed by a processor, implements a method according to claim 1.

17. An authentication method comprising:
   capturing a first image at a first relative position between a capture device and a to-be-captured object, wherein the first image comprises a first biometrics content of the to-be-captured object and a first background content;
   capturing a second image at a second relative position between the capture device and the to-be-captured object, wherein the second image comprises a second biometrics content of the to-be-captured object and a second background content;
   acquiring difference information of the first biometrics content and the first background content in the first image and the second biometrics content and the second background content in the second image, respectively; and
   determining whether authentication succeeds.

18. The authentication method according to claim 17, wherein each of the first relative position and the second relative position comprises a different relative distance between the capture device and the to-be-captured object.

19. The authentication method according to claim 17, wherein each of the first relative position and the second relative position comprises a different relative angle between the capture device and the to-be-captured object.

20. The authentication method according to claim 17, wherein the determining whether authentication succeeds comprises:
   determining whether the authentication succeeds according to the difference information.

21. The authentication method according to claim 20, wherein the acquiring difference information of the first biometrics content and the first background content in the first image and the second biometrics content and the second background content in the second image, respectively, comprises:
   acquiring changes in areas between areas occupied by the first biometrics content and the first background content in the first image and areas occupied by the second biometrics content and the second background content in the second image, respectively; and
   wherein the determining whether the authentication succeeds according to the difference information comprises:
   judging whether ratios of the changes in areas between the areas occupied by the first biometrics content and the first background content in the first image and the areas occupied by the second biometrics content and the second background content in the second image, respectively, are consistent; and if so, determining that the authentication fails; and if not, determining that the authentication succeeds.

22. The authentication method according to claim 20, wherein the acquiring difference information of the first biometrics content and the first background content in the first image and the second biometrics content and the second background content in the second image, respectively, comprises:
   acquiring changes in contents between the first biometrics content and the first background content in the first image and the second biometrics content and the second background content in the second image, respectively; and
   wherein the determining whether the authentication succeeds according to the difference information comprises:
   if there are no changes in contents between the first biometrics content and the second biometrics content, and between the first background content and the second background content, determining that the authentication fails; and
   if there are changes in contents between the first face content and the second face content, and between the first background content and the second background content, determining that the authentication succeeds.

* * * * *